(12) United States Patent
Dasylva et al.

(10) Patent No.: US 7,054,557 B1
(45) Date of Patent: May 30, 2006

(54) TECHNIQUE FOR ROUTING DATA WITHIN AN OPTICAL NETWORK

(75) Inventors: Abel C. Dasylva, Ottawa (CA); Delfin Y. Montuno, Kanata (CA); Yanhe Fan, Neapen (CA)

(73) Assignee: Nortel Networks Limited, St. Laurent (CA)

( * ) Notice: Subject to any disclaimer, the term of this patent is extended or adjusted under 35 U.S.C. 154(b) by 783 days.

(21) Appl. No.: 09/685,090

(22) Filed: Oct. 11, 2000

(51) Int. Cl.
*H04J 14/00* (2006.01)

(52) U.S. Cl. .................. 398/48; 398/45; 398/46; 398/47; 398/49; 398/50; 398/51; 398/52; 398/53; 398/54; 398/55; 398/56; 398/57; 398/58; 398/75; 398/79; 398/3; 398/5; 398/98; 398/100; 370/248; 370/352; 370/351; 370/389; 370/401; 370/395.1; 370/395.2; 370/395.54

(58) Field of Classification Search .................. 398/45, 398/47, 48, 49, 50, 51, 53, 54, 56, 57, 58, 398/100, 98, 46, 52, 55, 59, 75, 79, 3, 5; 370/248, 352, 389, 407, 351, 395.1, 395.2, 370/395.54, 401
See application file for complete search history.

(56) References Cited

U.S. PATENT DOCUMENTS

| | | | | |
|---|---|---|---|---|
| 5,253,250 | A * | 10/1993 | Schlafer et al. | 370/392 |
| 5,488,501 | A * | 1/1996 | Barnsley | 398/51 |
| 6,101,013 | A * | 8/2000 | Monacos | 398/1 |
| 6,292,464 | B1 * | 9/2001 | Elahmadi et al. | 370/223 |
| 6,525,850 | B1 * | 2/2003 | Chang et al. | 398/49 |
| 6,600,583 | B1 * | 7/2003 | Fatehi et al. | 398/82 |
| 6,738,354 | B1 * | 5/2004 | Ashwood Smith | 370/248 |
| 2005/0078659 | A1 * | 4/2005 | Ashwood Smith | 370/352 |

OTHER PUBLICATIONS

N.R. Jankowski, C. Bobcowski, D. Zipkin, R.R. Krchnavek, and R. Chamberlain, "MEMS-based optical switch design for reconfigurable fault-tolerant optical backplanes", in Proceedings of the 6th International Conference on Parallel Interconnects, Oct. 1999, pp. 149-156.

N. Ghani, "Lambda-labeling: A framework for IP-over-WDM using MPLS", in SPIE Optical Networks Magazine, Apr. 2000, pp. 45-58, vol. 1.

(Continued)

*Primary Examiner*—Hanh Phan
(74) *Attorney, Agent, or Firm*—Hunton & Williams LLP

(57) ABSTRACT

A technique for routing data within an optical network having a plurality of network nodes is disclosed. In one embodiment, the technique is realized by receiving data at a first network node via a first optical signal having a first wavelength. The first wavelength corresponds to a first optical frequency, and the first optical frequency is mapped to a first binary representation. The first binary representation is divided into a first plurality of fields, wherein at least one of the first plurality of fields corresponds to a routing label in a first label stack. A top routing label in the first label stack indicates a second network node. Based at least partially upon the top routing label, the data is transmitted from the first network node to the second network node via a second optical signal having a second wavelength. The first wavelength may be either the same as or different from the second wavelength.

24 Claims, 17 Drawing Sheets

OTHER PUBLICATIONS

C. Qiao, and M. Yoo, "Choices, features and issues in optical burst-switching", in SPIE Optical Networks Magazine, Apr. 2000, pp. 36-44, vol. 1.

D. Awduche, "MPLS traffic engineering in IP networks", IEEE Communications magazine, Dec. 1999, pp. 42-47, vol. 37.

P. Ashwood-Smith, Y. Fan, A. Banerjee, J. Drake, J.P. Lang, L. Berger, G. Bernstein, K. Kompella, E. Mannie, B. Rajagopalan, D. Saha, Z. Bo Tang, Y. Rekhter, and V. Sharma, "Generalized MPLS-Signaling Functional Description", IETF draft, Jun. 2000, work in progress.

* cited by examiner

TECHNIQUE FOR ROUTING DATA WITHIN AN OPTICAL NETWORK

FIELD OF THE INVENTION

The present invention relates generally to optical wavelength-switching and optical burst-switching and, more particularly, to a label-switching technique for routing data within an optical network.

BACKGROUND OF THE INVENTION

Emerging metropolitan optical networks are based on optical cross-connects (OXCs) controlled by internet protocols (IPs). Both elements perform the critical task of optical bandwidth provisioning. These networks currently provide end-to-end circuit-switched bandwidth allocation, through routing protocols like Open Shortest Path First (OSPF), and through signaling protocols like Multi-Protocol Label Switching (MPLS). The increasing needs for greater network connectivity, and efficient bandwidth utilization require more dynamic bandwidth provisioning schemes such as optical burst-switching (OBS) (see C. Qiao, and M. Yoo, "Choices, features and issues in optical burst-switching", SPIE Optical Networks Magazine, vol. 1, pages 36–44, April 2000). However, this potential evolution does not change the need for high-quality wavelength-switched optical service in the near to medium term. In this context, it is appropriate to design optical switching paradigms capable of efficiently supporting both types of services. However, the design of a common switch platform for wavelength-switching and optical burst-switching (OBS) raises problems, because of their quite different provisioning time-scales. In wavelength-switching, lightpaths are provisioned for hours, days or even months, while in optical burst-switching (OBS) bandwidth is reserved on burst time scales, which are measured in sub-milliseconds units. State of the art optical cross-connects (OXCs) built with micro-electro-mechanical systems (MEMS) technology may have cross-connection latencies expressed in tens of milliseconds (see N. R. Jankowski, C. Bobcowski, D. Zipkin, R. R. Krchnavek, and R. Chamberlain, "MEMS-based optical switch design for reconfigurable fault-tolerant optical backplanes", Proceedings of the 6$^{th}$ International Conference on Parallel Interconnects, pages 149–156, October 1999). These devices certainly have enough agility to support wavelength-switching, but cannot establish optical cross-connections on a per-burst basis as it is required by optical burst-switching (OBS).

In view of the foregoing, it would be desirable to provide optical wavelength-switching and optical burst-switching techniques for routing data within an optical network which overcome the above-described inadequacies and shortcomings.

SUMMARY OF THE INVENTION

According to the present invention, a technique for routing data within an optical network having a plurality of network nodes is provided. In one embodiment, the technique is realized by receiving data at a first network node via a first optical signal having a first wavelength. The first wavelength corresponds to a first optical frequency, and the first optical frequency is mapped to a first binary representation. The first binary representation is divided into a first plurality of fields, wherein at least one of the first plurality of fields corresponds to a routing label in a first label stack. A top routing label in the first label stack indicates a second network node. Based at least partially upon the top routing label, the data is transmitted from the first network node to the second network node via a second optical signal having a second wavelength. The first wavelength may be either the same as or different from the second wavelength.

In accordance with other aspects of the present invention, the top routing label may be popped off the first label stack so as to promote a next routing label in the first label stack. If such is the case, the second wavelength corresponds to a second optical frequency, wherein the second optical frequency is mapped to a second binary representation. The second binary representation is divided into a second plurality of fields, wherein at least one of the second plurality of fields corresponds to a routing label in a second label stack. The top routing label in the second label stack indicates a third network node. Also, the top routing label in the second label stack corresponds to the next routing label in the first label stack. Further, if the network accommodates $2^N$ frequencies in the form of, $$f_i = f_0 + i \cdot \Delta f$$

wherein i=0, 1, ... $2^N$−1, the second optical frequency may be defined by, $$f_{i_{out}} = f_0 + 2^L((f_{i_{in}} - f_0) - 2^{N-L} \cdot l \cdot \Delta f)$$

and, $$i_{out} = 2^L(i_{in} - 2^{N-L} \cdot l)$$

wherein $fi_{in}$ represents the first optical frequency, l represents the value of the top routing label in the first label stack, and L represents the bit length of the top routing label in the first label stack.

In accordance with further aspects of the present invention, the top routing label in the first label stack may be swapped with a new routing label when the first label stack contains more than two routing labels. If such is the case, the second wavelength corresponds to a second optical frequency, wherein the second optical frequency is mapped to a second binary representation. The second binary representation is divided into a second plurality of fields, wherein at least one of the second plurality of fields corresponds to a routing label in a second label stack. A top routing label in the second label stack indicates a third network node. Also, the top routing label in the second label stack corresponds to the new routing label. Further, if the network accommodates $2^N$ frequencies in the form of, $$f_i = f_0 + i \cdot \Delta f$$

wherein i=0, 1, ... $2^N$−1, the second optical frequency may be defined by, $$f_{i_{out}} = f_{i_{in}} + 2^{N-L}(l - l^1)\Delta f$$

and, $$i_{out} = i_{in} + 2^{N-L}(l - l^1)$$

wherein $fi_{in}$ represents the first optical frequency, $l^1$ represents the value of the top routing label in the first label stack, l represents the value of the new routing label, and L represents the bit length of the top routing label in the first label stack.

In accordance with still further aspects of the present invention, a new routing label may be pushed onto the first label stack. If such is the case, the second wavelength corresponds to a second optical frequency, wherein the second optical frequency is mapped to a second binary representation. The second binary representation is divided into a second plurality of fields, wherein at least one of the second plurality of fields corresponds to a routing label in a second label stack. A top routing label in the second label stack indicates a third network node. Also, the top routing label in the second label stack corresponds to the new routing label. Further, if the network accommodates $2^N$ frequencies in the form of, $$f_i = f_0 + i \cdot \Delta f$$

wherein i=0, 1, ... $2^N-1$, the second optical frequency is defined by, $$f_{i_{out}} = f_0 + \left\lfloor \frac{(f_{i_{in}} - f_0)}{\Delta f} \right\rfloor \cdot 2^{-L} \cdot \Delta f + 2^{N-L} \cdot l \cdot \Delta f$$

and, $$i_{out} = \left\lfloor \frac{i_{in}}{2^L} \right\rfloor + 2^{N-L} \cdot l$$

wherein $fi_{in}$ represents the first optical frequency, l represents the value of the top routing label in the second label stack, and L represents the bit length of the top routing label in the second label stack.

In accordance with still further aspects of the present invention, at least another one of the first plurality of fields may correspond to a termination field indicating an end of the first label stack. Also, at least another one of the first plurality of fields may correspond to a contention field for use in differentiating the first wavelength from a third wavelength. If such is the case, the data is defined as a first data, and a second data is received at the first network node via a third optical signal having the third wavelength, wherein the first optical signal and the third optical signal have similar routing paths through the network.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Label-switching comprises of all the data routing and switching paradigms where packets are forwarded to next-hop nodes according to specific labels. In these schemes, there is no route computation on a per-packet basis, and there is often a one-to-one mapping between labels and outgoing interfaces at network nodes. Label-switching enables the network to replace computation intensive layer 3 operations (e.g. route computation) by simpler layer 2 operations, which are implemented with dedicated high performance hardware.

Figure 1:
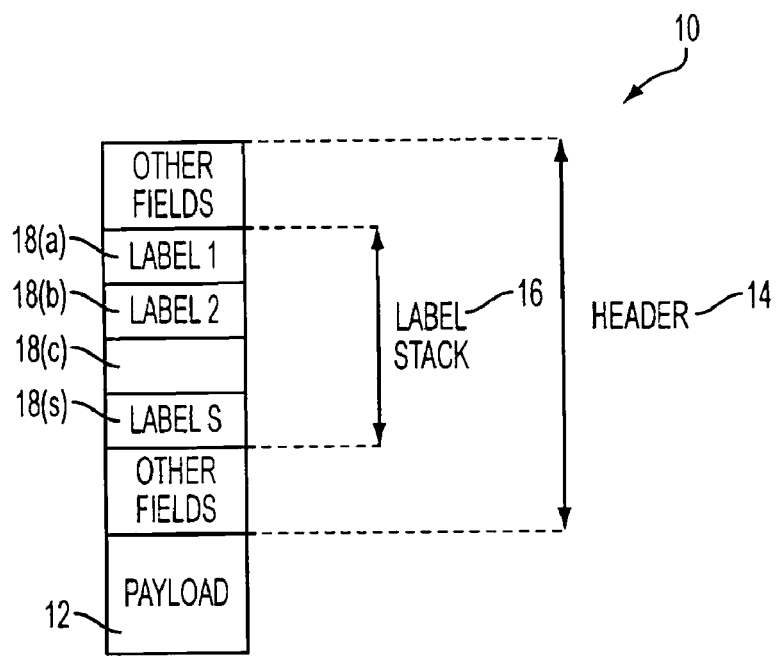
FIG. 1 shows a conventional label stack in a data packet.

Label-switching relies on three fundamental operations, which are label-swap, label-pop, and label-push. To explain these operations, we assume that in each packet header, the labels are organized into a stack, as shown in FIG. 1. That is, FIG. 1 shows a data packet 10 comprising a payload 12 and a header 14, wherein the header 14 comprises a label stack 16 including a plurality of labels 18.

Figure 2:
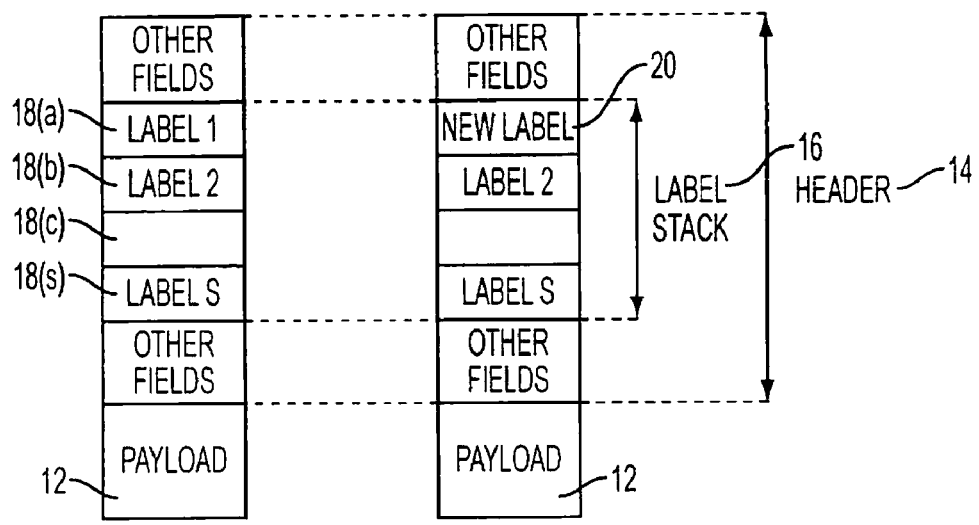
FIG. 2 shows a conventional label-swap operation.

The label-swap operation simply replaces the top label 18*a* of the stack 16 with a new label 20 contained in a switching table (not shown), as shown in FIG. 2. The binding between the old label 18*a* and the new label 20 is usually defined at connection setup.

Figure 3:
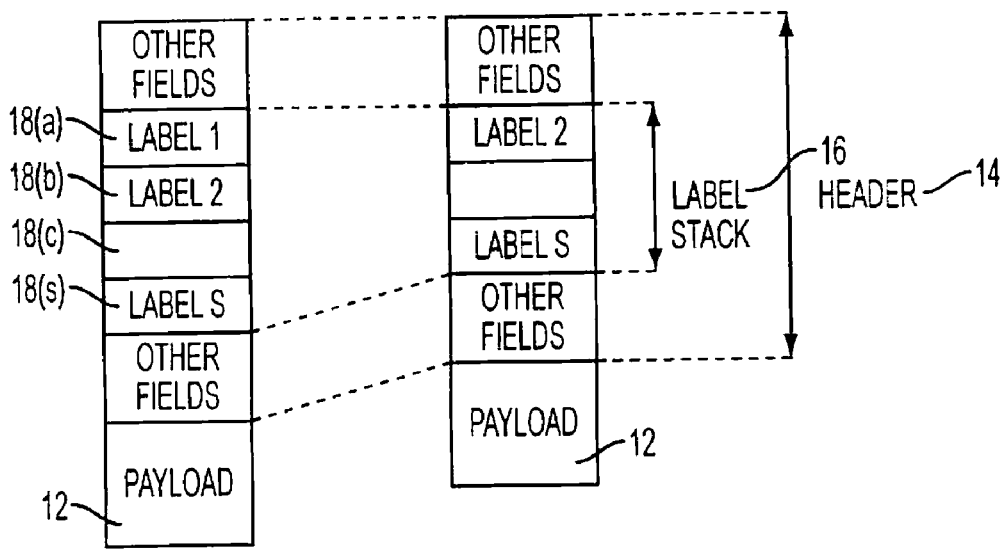
FIG. 3 shows a conventional label-pop operation.

The label-pop operation simply pops the top label 18*a* of the stack 16, as shown in FIG. 3.

Figure 4:
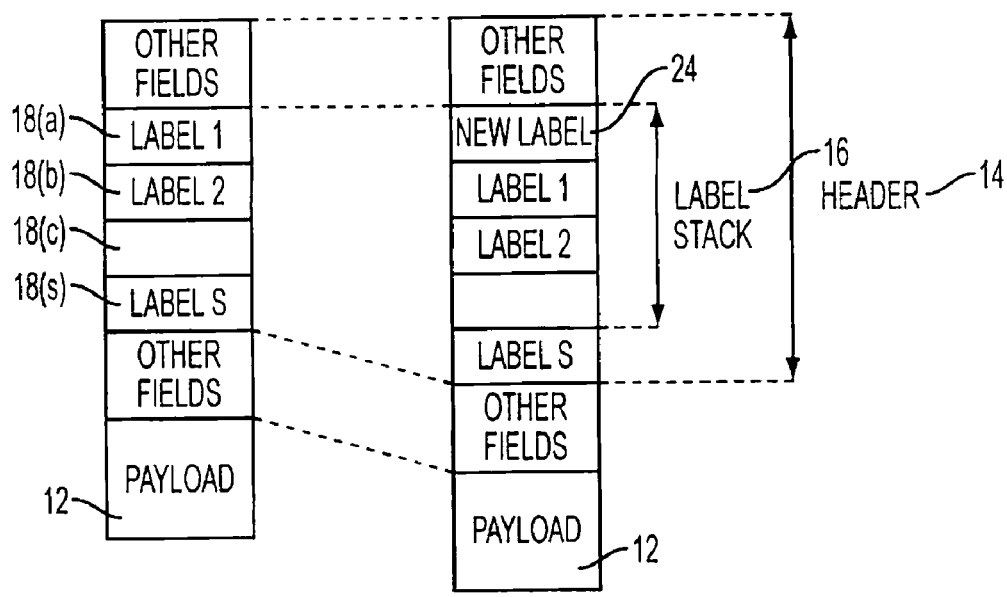
FIG. 4 shows a conventional label-push operation.

The label-push operation simply inserts a new label 24 into the stack 16, as shown in FIG. 4.

The joint use of the label-pop operation and the label-push operation enables the definition of virtual paths.

The definition of routing labels may be static or dynamic. In the static case, the labels and the mapping between labels and next-hop nodes are based on configuration information, as in the case of MPLS hop-by-hop routing. When labels are defined dynamically, the labels or the binding between labels and next-hop nodes are set on a per-flow basis, by a signaling protocol.

Figure 5:
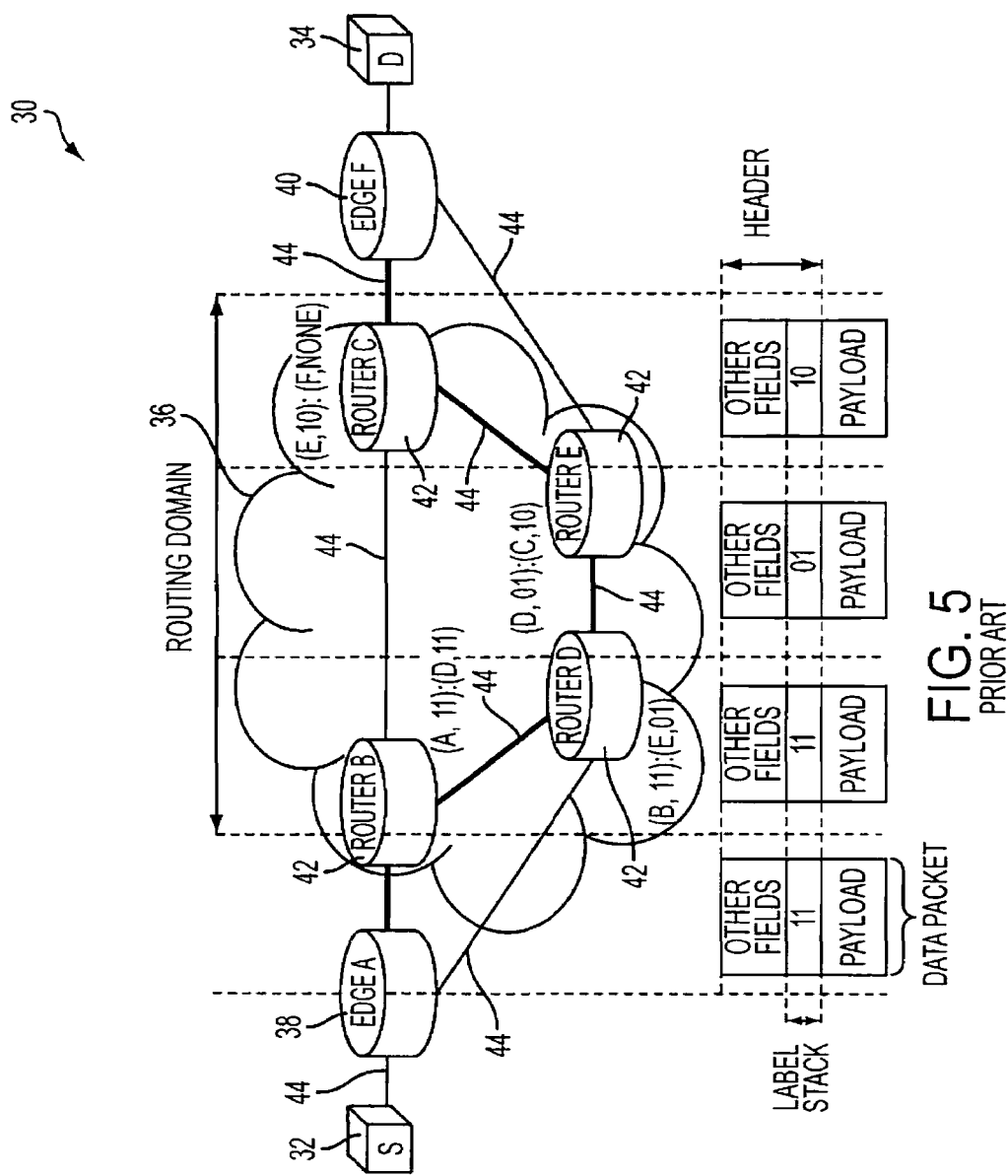
FIG. 5 shows a system wherein label-switched routing is performed using a conventional label-swap operation.

FIG. 5 shows a system 30 wherein label-switched routing is performed using the label-swap operation. That is, the system 30 comprises a source 32, a destination 34, and a network 36, which includes a first edge node 38, a second edge node 40, and a plurality of routers 42 interconnected by a plurality of interconnects 44. As a data packet advances across the network 36 from the source 32 to the destination 34, the top label of the label stack is simply replaced with a new label contained in a switching table, as shown (e.g., at router D, the top label 11 from incoming router B is replaced with new top label 01 for outgoing router E). As mentioned above, the binding between the old label and the new label is usually defined at connection setup.

Figure 6:
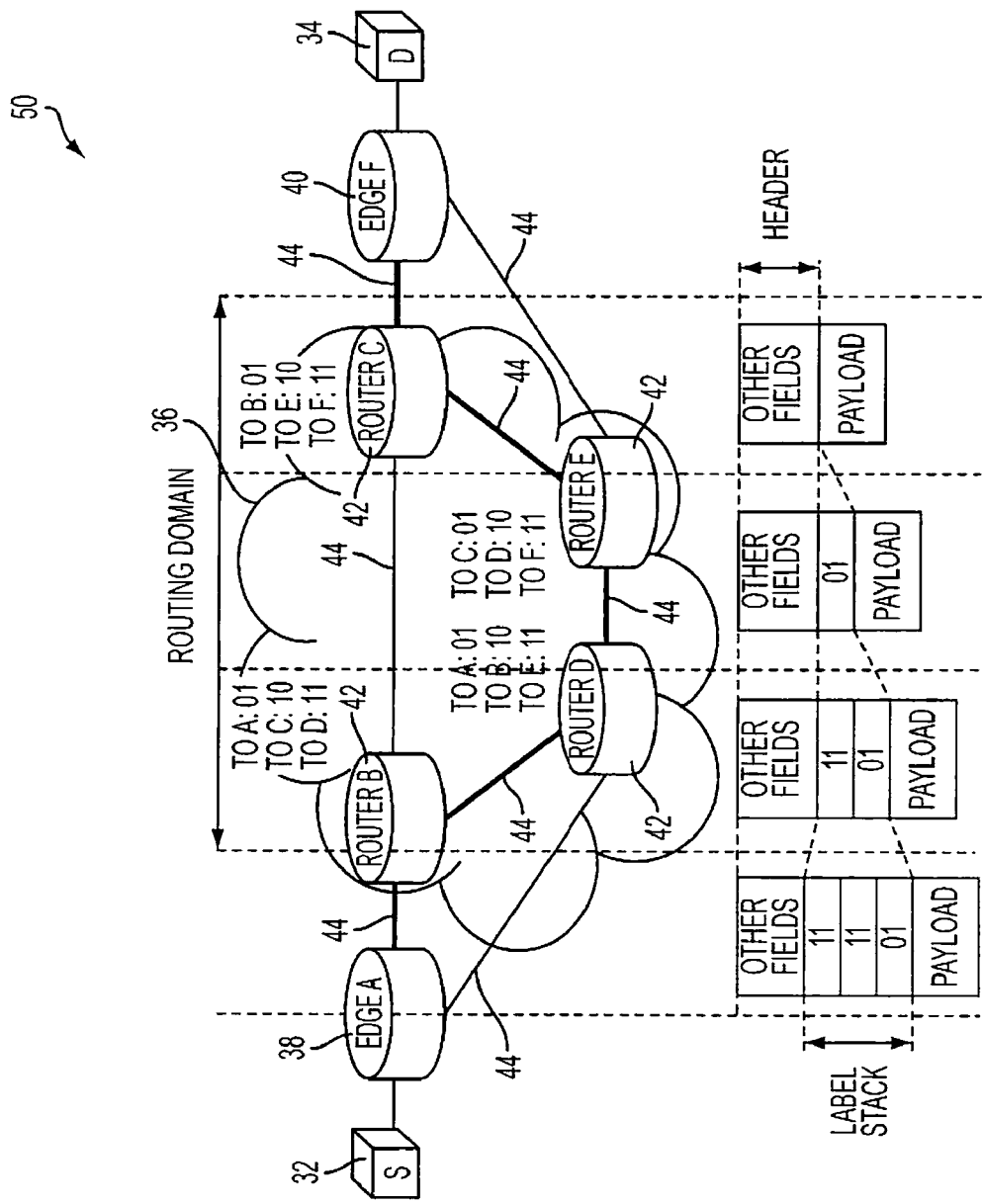
FIG. 6 shows a system wherein label-switched routing is performed using a conventional label-pop operation.

FIG. 6 shows a system 50 wherein label-switched routing is performed using the label-pop operation. The system 50 is physically identical to the system 30 and thus is numerically identified as such. However, in the system 50, as a data packet advances across the network 36 from the source 32 to the destination 34, the top label of the label stack is simply popped off the label stack, as shown (e.g., at router D, the top label 11, indicating router E, is popped off the label stack). This operation reduces the header overhead of packets as they get closer to egress nodes.

The label-switching paradigm has also been extended to wavelength division multiplexing (WDM) networks. In fact, IP label-switching protocols have been extended to support wavelength-switching, where lightpaths are established and deleted according to a circuit-switching paradigm. These extensions use wavelengths as labels, and have been called optical label-switching protocols (see N. Ghani, "Lambda-labeling: A framework for IP-over-WDM using MPLS", SPIE Optical Networks Magazine, vol. 1, pages 45–58, April 2000). However, these protocols do not explicitly encode route information in wavelengths or interfaces (i.e., it is impossible to predict the next hop of an optical packet by simply considering its incoming interface and its wavelength). Instead, the assignment of wavelengths to outgoing interfaces is assumed to be utterly arbitrary, and only decided at connection setup, on a per-flow basis. Although waveband routing appears as an option of current optical label-switching protocols, these protocols do not address the appropriate definition of wavebands to provide source-routing for optical burst-switching (OBS) or circuit-switched wavelength routing.

Figure 7:
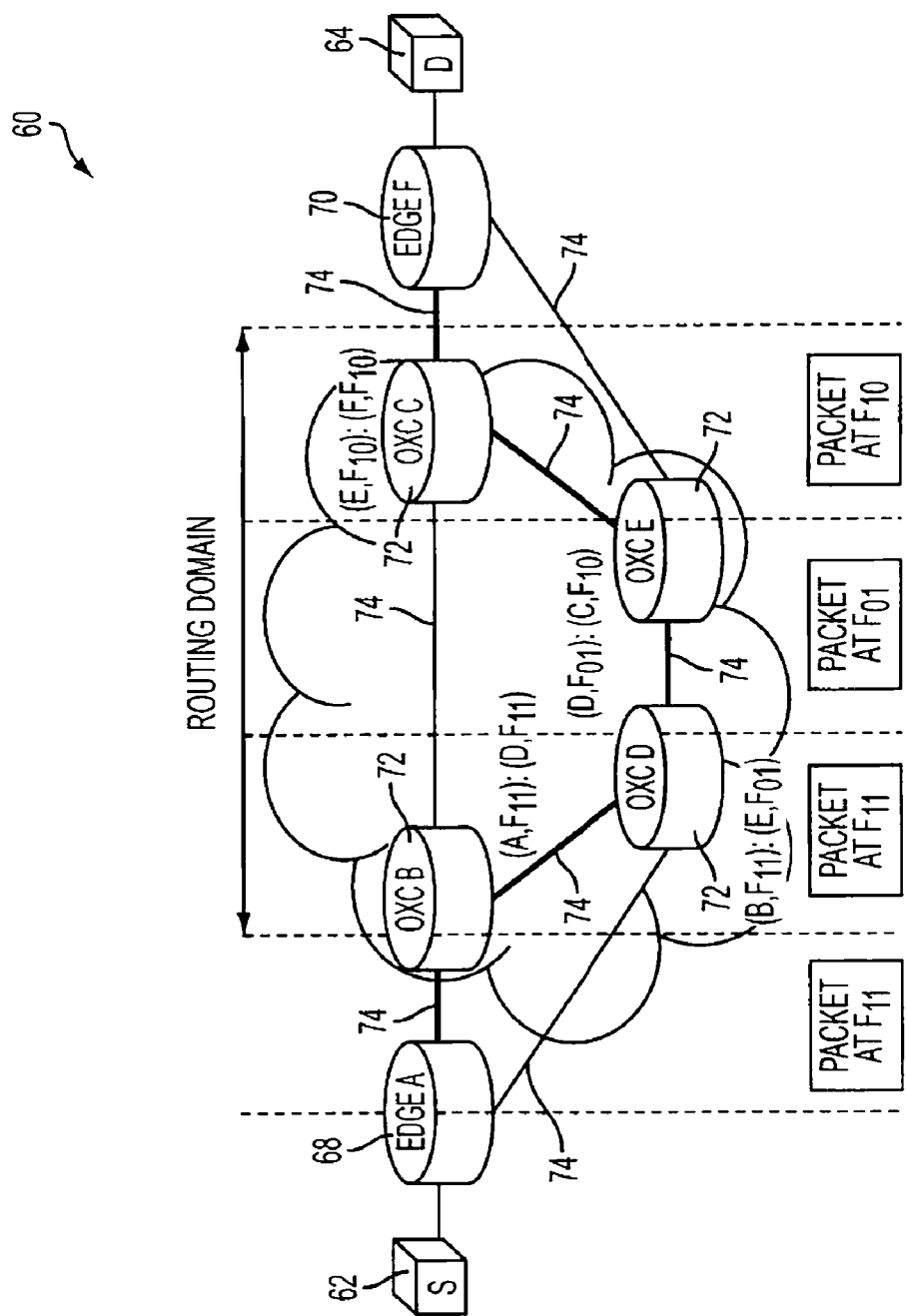
FIG. 7 shows a wavelength-switched WDM system wherein conventional wavelength-switching is performed.

Referring to FIG. 7, there is shown a wavelength-switched WDM system 60 that may be operating under any of the protocols that have heretofore been proposed for optical label-switching. The wavelength-switched WDM system 60 comprises a source 62, a destination 64, and a network 66, which includes a first edge node 68, a second edge node 70, and a plurality of optical cross-connects (OXC) 72 interconnected by a plurality of interconnects 74. As shown in FIG. 7, as a data packet advances across the network 66 from the source 62 to the destination 64, the wavelength at which the data packet is transmitted changes.

Figure 8:
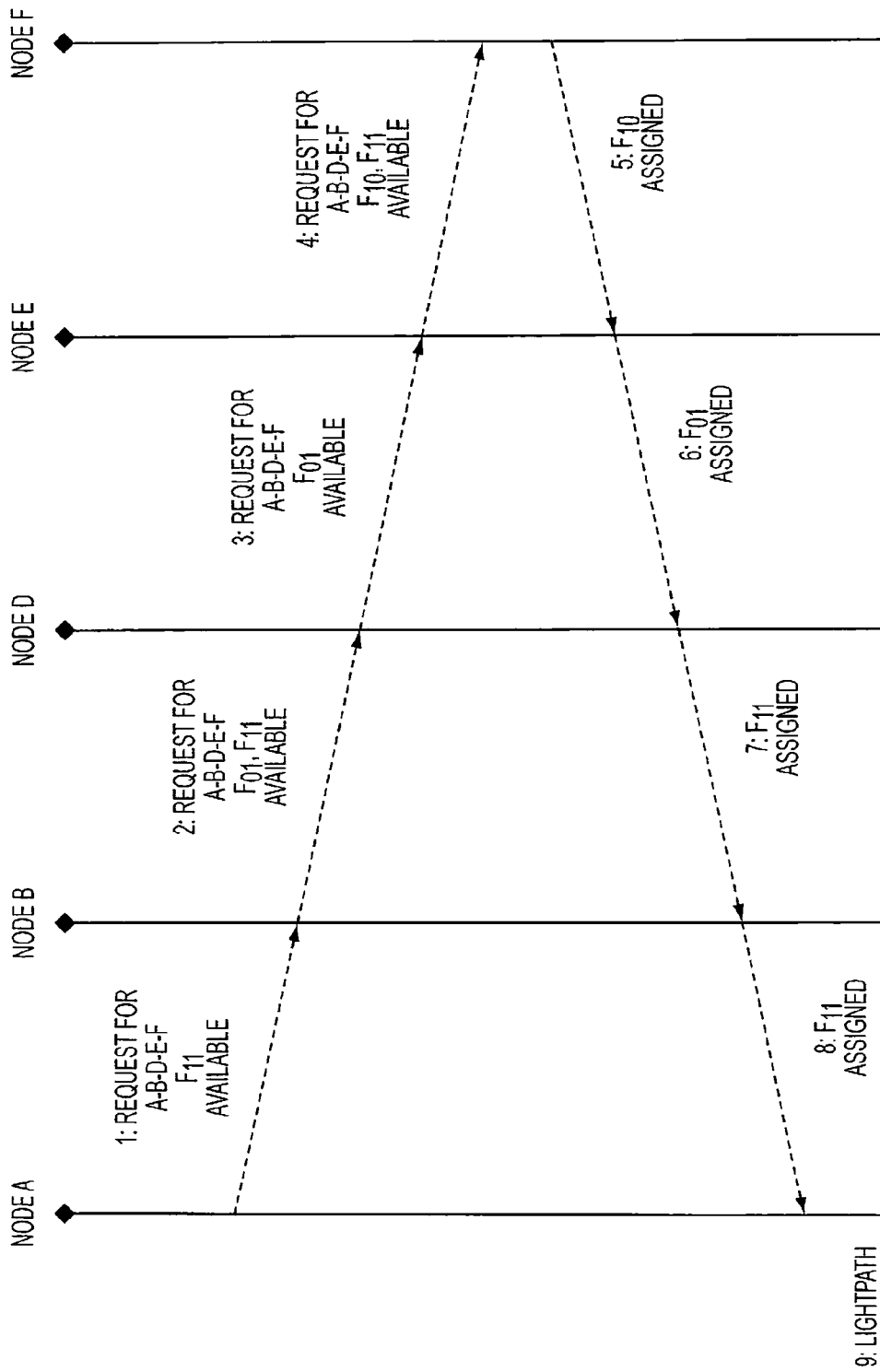
FIG. 8 illustrates the two-way reservation process that takes place in the wavelength-switched WDM system of FIG. 7.

It is assumed that there is a request for a lightpath with a bandwidth of one wavelength between the source 62 and the destination 64. The assignment of wavelengths to the different portions of the lightpath is only based on the availability of the wavelength channels, and on the wavelength-conversion capabilities. Bindings between incoming and outgoing channels are stored in connection tables, as shown in FIG. 7. The connection table entries corresponding to the lightpath request between the source 62 and the destination 64 are represented by giving the incoming node and wavelength, as well as the outgoing node and wavelength. For example, at a first optical cross-connect 72 (i.e., OXC B), the entry $(A,F_{11}):(D,F_{11})$ means that the channel coming from the first edge node 68 at optical frequency $F_{11}$ is to be switched to a second optical cross-connect 72 (i.e., OXC node D) at frequency $F_{11}$. FIG. 8 illustrates the two-way reservation process that takes place prior to the establishment of the connection between the source 62 and the destination 64 in the system 60 of FIG. 7.

Optical burst-switching (OBS) is based on a tell-and-go transmission model wherein traffic sources send control packets ahead of data bursts and do not wait for resource confirmation messages before transmitting data packets (see C. Qiao, and M. Yoo, "Choices, features and issues in optical burst-switching", SPIE Optical Networks Magazine, vol. 1, pages 36–44, April 2000). The burst transmission latency is the amount of time that separates control packets and data bursts. It is computed at network ingress nodes to give the network enough time to setup the requested circuits. In WDM networks, optical burst-switching (OBS) control packets request wavelength cross-connections on a per-burst basis. Assuming that the OXCs in the network have a cross-connection latency (i.e., the time it takes to connect two physical ports in an OXC) of $\delta_x$, a message processing delay of $\delta_m$, and an H hop path with propagation delay of $\delta_p$, the burst transmission latency must be at least equal to $\delta_{min} = H \cdot (\delta_x + \delta_m) - \delta_p$.

Figure 9:
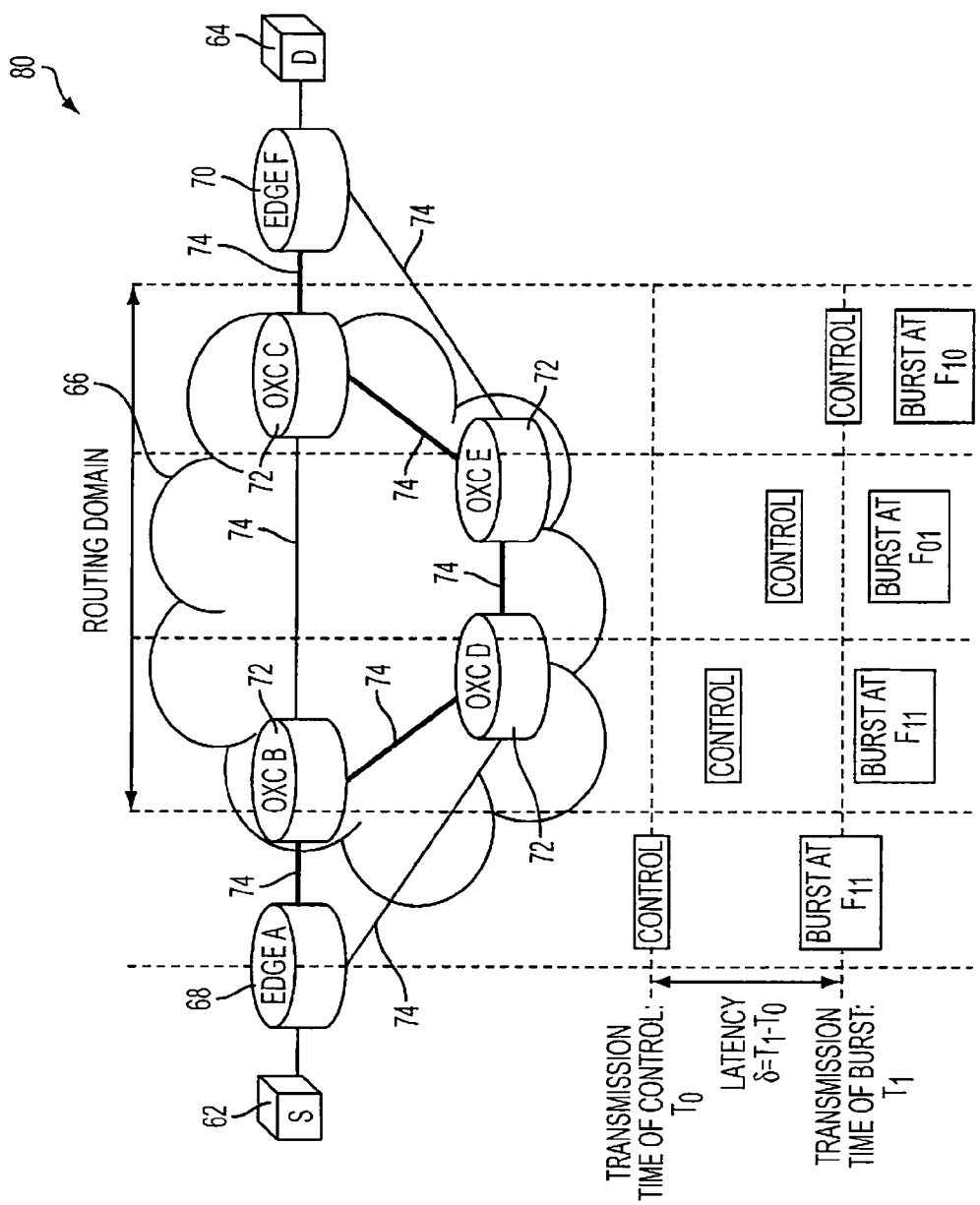
FIG. 9 shows a burst-switched WDM system for illustrating a conventional burst-switched transmission.

Referring to FIG. 9, there is shown a burst-switched WDM system 80 for illustrating a burst-switched transmission. The system 80 is physically identical to the system 60 and thus is numerically identified as such. Also, similar to the system 60, in the system 80, as a data packet advances across the network 66 from the source 62 to the destination 64, the wavelength at which the data packet is transmitted changes. However, in the system 80, the data packets are sent in bursts preceded by control packets.

The efficiency of the burst-switching paradigm decreases as the burst transmission latency increases. Unfortunately, state-of-the art OXCs still have cross-connection latencies ($\delta_x$) in the tens of milliseconds range, which is a dominant parameter of the overall burst-transmission latency and imposes an upper limit on attainable throughputs.

To overcome the problems associated with the aforementioned conventional label-switching schemes, a new label-switching paradigm is disclosed. This new label-switching paradigm involves the explicit encoding of routing information through specific wavelength assignments. That is, in this new label-switching paradigm, a wavelength is equivalent to a binary string. This binary string is partitioned into routing bits, and contention resolution bits. The two types of bits are handled by disjoint operations to meet the routing and the contention resolution needs of the network. Thus, this new label-switching paradigm is realized via a new label-stack format, and the processing of optical labels through specific label-stack operations, which are both described in detail below.

At the outset, it is assumed that the new label-switching paradigm is operating in a dense wavelength division multiplexing (DWDM) network with $W=2^N$ optical frequencies of the form $f_i=f_0+i.\Delta f$, where $i=0, \ldots, 2^N-1$. It is also assumed that this network has proper wavelength-conversion facilities at all network nodes to support the different operations described below.

Figure 10:
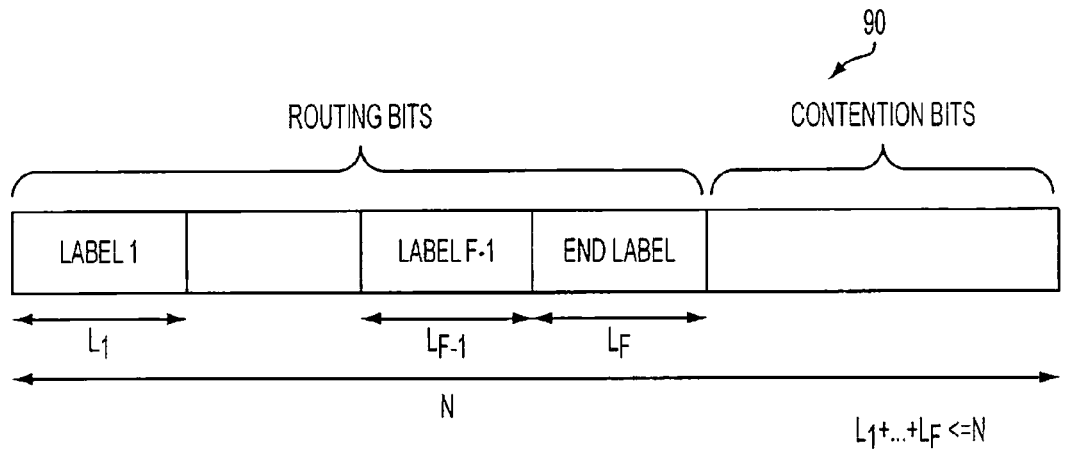
FIG. 10 shows a label stack format in accordance with the present invention.

Referring to FIG. 10, there is shown a label stack format 90 in accordance with the present invention. To encode the label stack, each optical frequency, $f_i$, is mapped to the binary representation of i. For example, when N=8, frequency $f_{161}$ is mapped to binary number 10100001. The binary number of the optical frequency is then divided into smaller fields corresponding to routing labels. The obtained set of labels (i.e., Label 1, Label 2, etc.), read from left to right, and an optional stack termination string (i.e., End label), define the label stack of the wavelength channel. The lengths of the routing labels and their interpretation may be node and interface dependent. Therefore, the label stack associated with a particular wavelength depends on the selected lightpath.

To illustrate the foregoing, first consider N=8, a fixed label length L=2, and a stack termination string equal to 00. Then, the label stack of frequency $f_{161}$ includes two labels that are $l_{161}^1=10$, $l_{161}^2=10$. However, if the lightpath goes through two nodes supporting label-switched routing, such that the first node uses labels of length $L_1=1$, and the second node uses labels of length $L_2=3$, two different labels are obtained for $f_{161}$, which are $l_{161}^1=1$, $l_{161}^2=010$.

The label-stack operations include label-swap, label-pop, and label-push operations. The label-swap operation replaces the first label of the stack with another label, to be used by the next-hop. This operation requires that the swapped labels have the same length. The label-swap operation can be mathematically defined as follows.

Consider some frequency $f_{i_{in}}$, such that the first label of the stack is $l^1$ of length L, and some other label $0 \leq l < 2^L$. When $l^1$ is replaced with l, the frequency $f_{i_{out}}$ is obtained which satisfies the following equations:

$$f_{i_{out}} = f_{i_{in}} + 2^{N-L}(l-l^1)\Delta f$$

$$i_{out} = i_{in} + 2^{N-L}(l-l^1)$$

Figure 11:
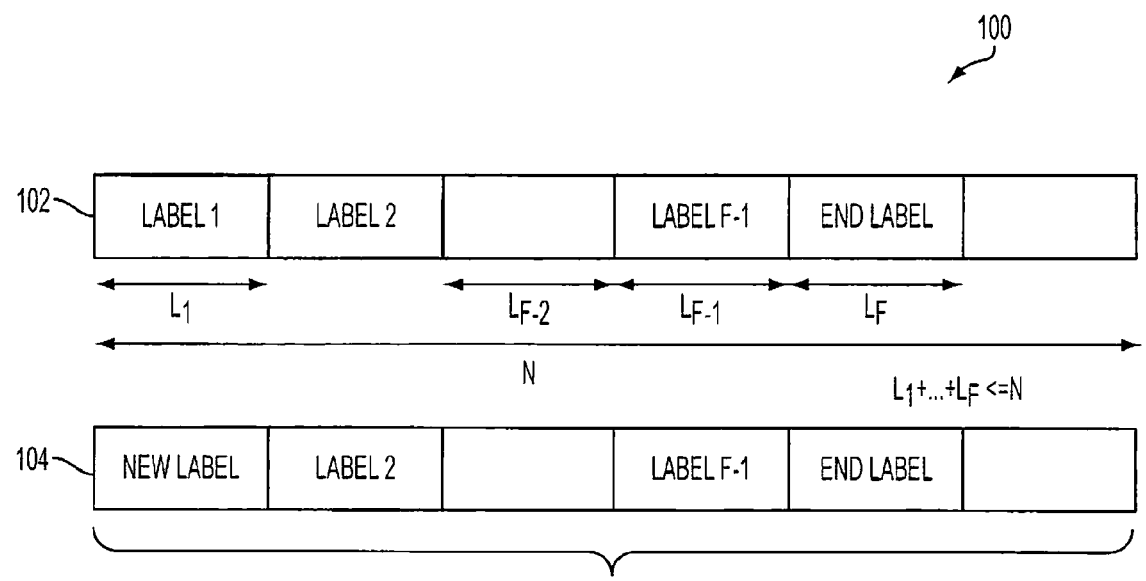
FIG. 11 shows a label-swap operation in accordance with the present invention.

FIG. 11 further illustrates the label-swap operation 100 wherein the first label (i.e., Label 1) in an initial label stack 102 is replaced with a new label (i.e., New label) in a resulting label stack 104.

To give an example of the label-swap operation, consider, as before, N=8, a fixed label length L=2, and a stack termination string equal to 00. The first label of the stack of frequency $f_{161}$ is $l_{161}^1=10$. When this first label is replaced (i.e., swapped) with a new label l=01, the output frequency $f_{i_{out}}=f_{97}$ is obtained.

In the label-pop operation, labels that have already been used can be removed from the label stack without any impact on the optical service received by a wavelength channel. The removal of such useless labels from the stack simplifies the task of subsequent network nodes. To remove labels from the stack, a label-popping wavelength-conversion is performed.

The precise mathematical definition of the label-pop operation for a label, l, of length L (in number of bits) is given by the following equations:

$$f_{i_{out}} = f_0 + 2^L((f_{i_{in}} - f_0) - 2^{N-L}.l.\Delta f)$$

$$i_{out} = 2^L(i_{in} - 2^{N-L}.l)$$

Figure 12:
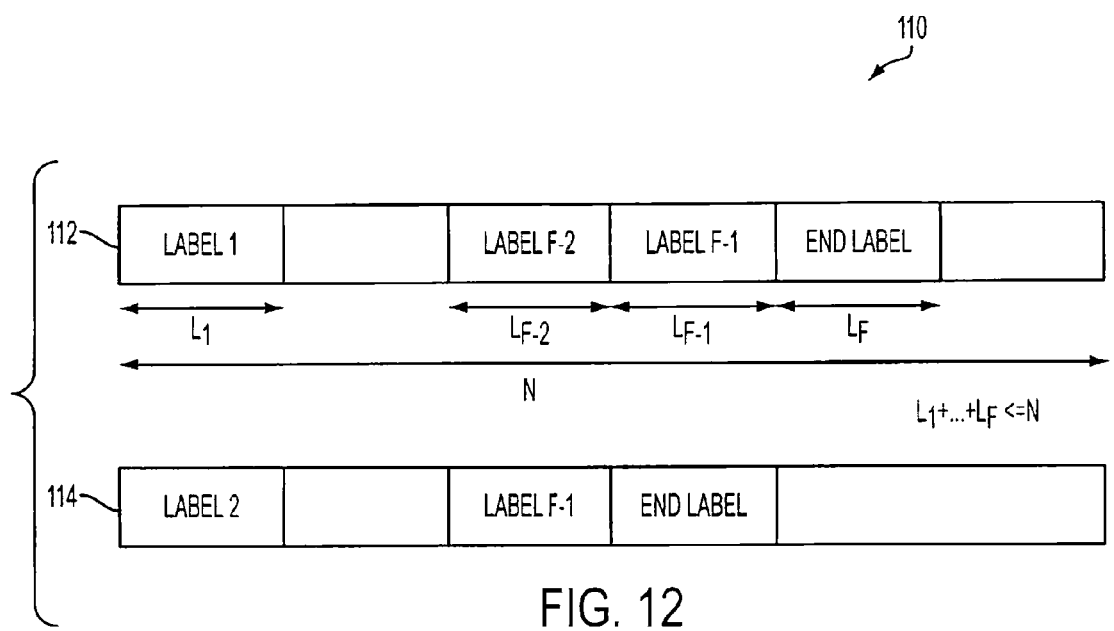
FIG. 12 shows a label-pop operation in accordance with the present invention.

In this definition, it is assumed that l is the first label of the label stack of $f_{in}$. FIG. 12 further illustrates the label-pop operation 110 wherein the first label (i.e., Label 1) in an initial label stack 112 is removed (i.e., popped) in a resulting label stack 114.

To give an example of the label-pop operation, consider, as before, N=8, a fixed label length L=2, and a stack termination string equal to 00. When the frequency $f_{161}$ is popped, the output frequency $f_{132}$ is obtained. It is important to note that the label-pop operation also affects the wavelength bits that are not part of the label stack. However, this operation can be defined in a way that does not affect the bits outside of the label stack.

The label-push operation is opposite to the label-pop operation as it introduces new labels into the stack. The label-push operation is useful to introduce new routing labels into the label stack at any point along the lightpath. However, pushed labels must be defined through prior signaling or recovered from data packets by other means than wavelength encoding.

The precise mathematical definition of the label-push operation for a label l of length L (in number of bits) is given by the following equations:

$$f_{i_{out}} = f_0 + \left\lfloor \frac{(f_{i_{in}} - f_0)}{\Delta f} \right\rfloor \cdot 2^{-L} \cdot \Delta f + 2^{N-L} \cdot l \cdot \Delta f$$

$$i_{out} = \left\lfloor \frac{i_{in}}{2^L} \right\rfloor + 2^{N-L} \cdot l$$

Figure 13:
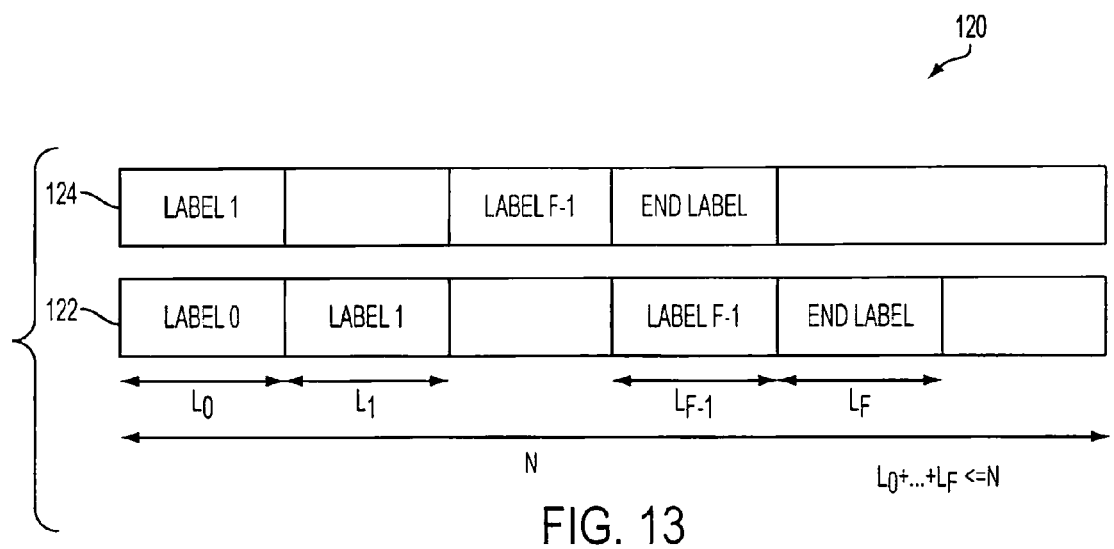
FIG. 13 shows a label-push operation in accordance with the present invention.

FIG. 13 further illustrates the label-push operation 120 wherein a new label (i.e., Label 0) in a resulting label stack 122 is introduced (i.e., pushed) over the first label (i.e., Label 1) in an initial label stack 124.

To give an example of the label-push operation, consider, as before, N=8, a fixed label length L=2, and a stack termination string equal to 00. When the label l=10 is pushed into frequency $f_{160}$, the output frequency $f_{168}$ is obtained.

In wavelength-switching networks, it is necessary to avoid wavelength contention. When such contention occurs, it can be resolved by changing the wavelength bits that are not meaningful from the point of view of routing, which are hereafter referred to as wavelength contention resolution bits. For example, consider, as before, N=8, a fixed label length L=2, and a stack termination string equal to 00. Also, assume that two wavelength-channels share the same network path starting from some common downstream node, and are both assigned the frequency $f_{161}$ in the hop prior to a common node. To avoid collision on the next-hop link, one of these channels may be assigned to another frequency (e.g., frequency $f_{163}$) before undergoing any label-stack operation. Of course, the newly assigned frequency (i.e., frequency $f_{163}$) must be available on the link. It is easy to check that the wavelength-interchange that occurs does not modify the original routing information contained in the frequency.

Figure 14:
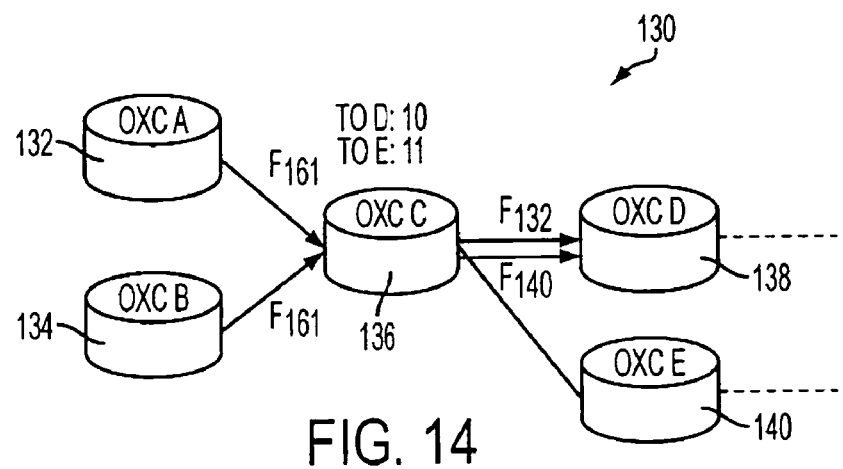
FIG. 14 shows an example of wavelength contention resolution in accordance with the present invention.

Referring to FIG. 14, a representation 130 of the above-described wavelength contention resolution example is provided wherein data packets are being transmitted from both a first OXC 132 (i.e., OXC A) and a second OXC 134 (i.e., OXC B) at the frequency $f_{161}$ to a third OXC 136 (i.e., OXC C). The third OXC 136 assigns the transmission from the first OXC 132 to another frequency (e.g., frequency $f_{163}$) before undergoing any label-stack operation to avoid collision on the next-hop link. In this particular example, the third OXC 136 assigns the new frequency by changing the two least significant wavelength bits (i.e., the wavelength contention resolution bits). The third OXC 136 then performs a label-pop operation on the incoming wavelength-channels before forwarding them to a fourth OXC 138 (i.e., OXC D). In the above-described example, it is assumed that the mapping between routing labels and next-hop nodes is the same for all incoming interfaces.

The above-described new label-switching paradigm may support wavelength-switching and wavelength-trunking, as well as optical burst-switching. For all of these label-switching applications, the new label-switching paradigm offers many options to establish lightpaths, depending on the type of label-switching operation used at the different hops of a path, and on the nature of the network hops. That is, in some cases each hop may map to a physical link, while in other cases some hops may be logical and correspond to virtual paths. In the following description, examples of each of the above-mentioned label-switching applications are provided, although it should be noted that the present invention is not limited to these specific examples.

Figure 15:
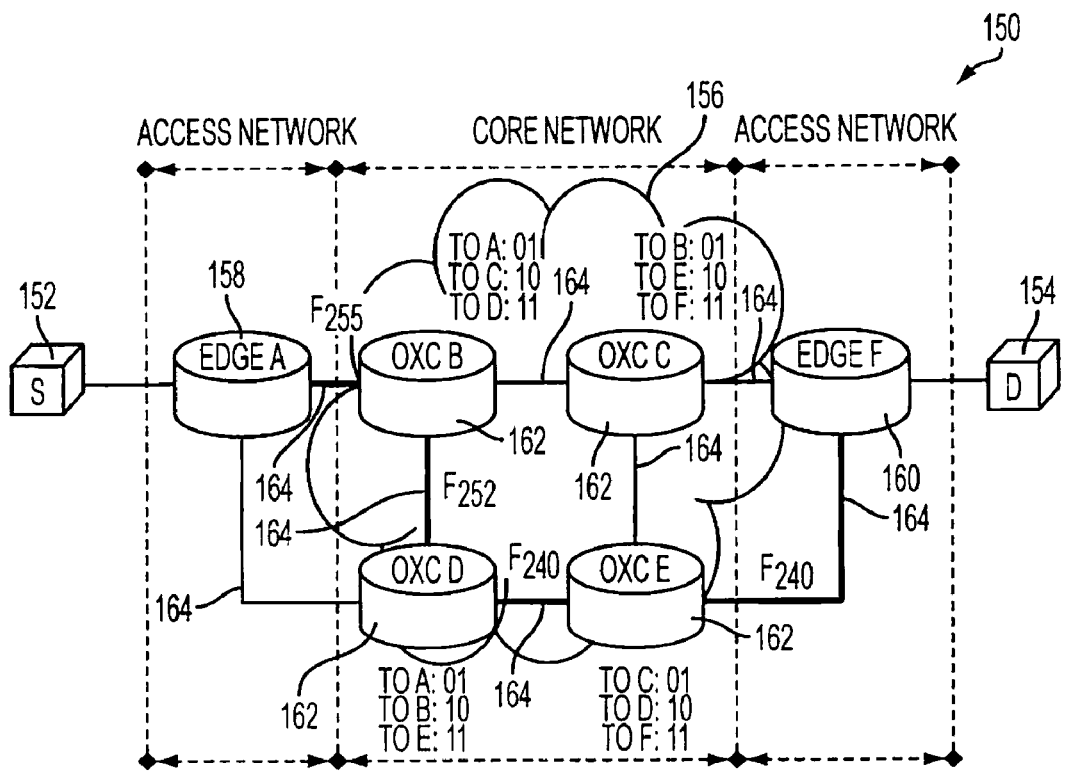
FIG. 15 shows a wavelength-switched WDM system that employs a label-pop operation in accordance with the present invention.

Referring to FIG. 15, there is shown a wavelength-switched WDM system 150 that employs the label-pop operation in accordance with the present invention. The wavelength-switched WDM system 150 comprises a source 152, a destination 154, and a network 156, which includes a first edge node 158, a second edge node 160, and a plurality of optical cross-connects (OXC) 162 interconnected by a plurality of interconnects 164. In the wavelength-switched WDM system 150, a number W=256 (i.e., N=8) of consecutive regularly spaced wavelength channels are assumed, as is a label length L=2. Also, it is assumed that the traffic demand comprises one wavelength channel between the source 152 and the destination 154.

The source 152 and the destination 154 access the core network through the first edge node 158 and the second edge node 160, respectively. In the core network, the plurality of optical cross-connects (OXC) 162 provide waveband-routing by employing the label-pop operation in accordance with the present invention. The mapping between next-hop nodes and labels is given for each node 162 in the core network by the small table located next to each node 162 in the core network, as shown in FIG. 15. For example, in the case of node OXC B, the mapping is the following:

Next-hop A: 01
Next-hop C: 10
Next-hop D: 11

Figure 16:
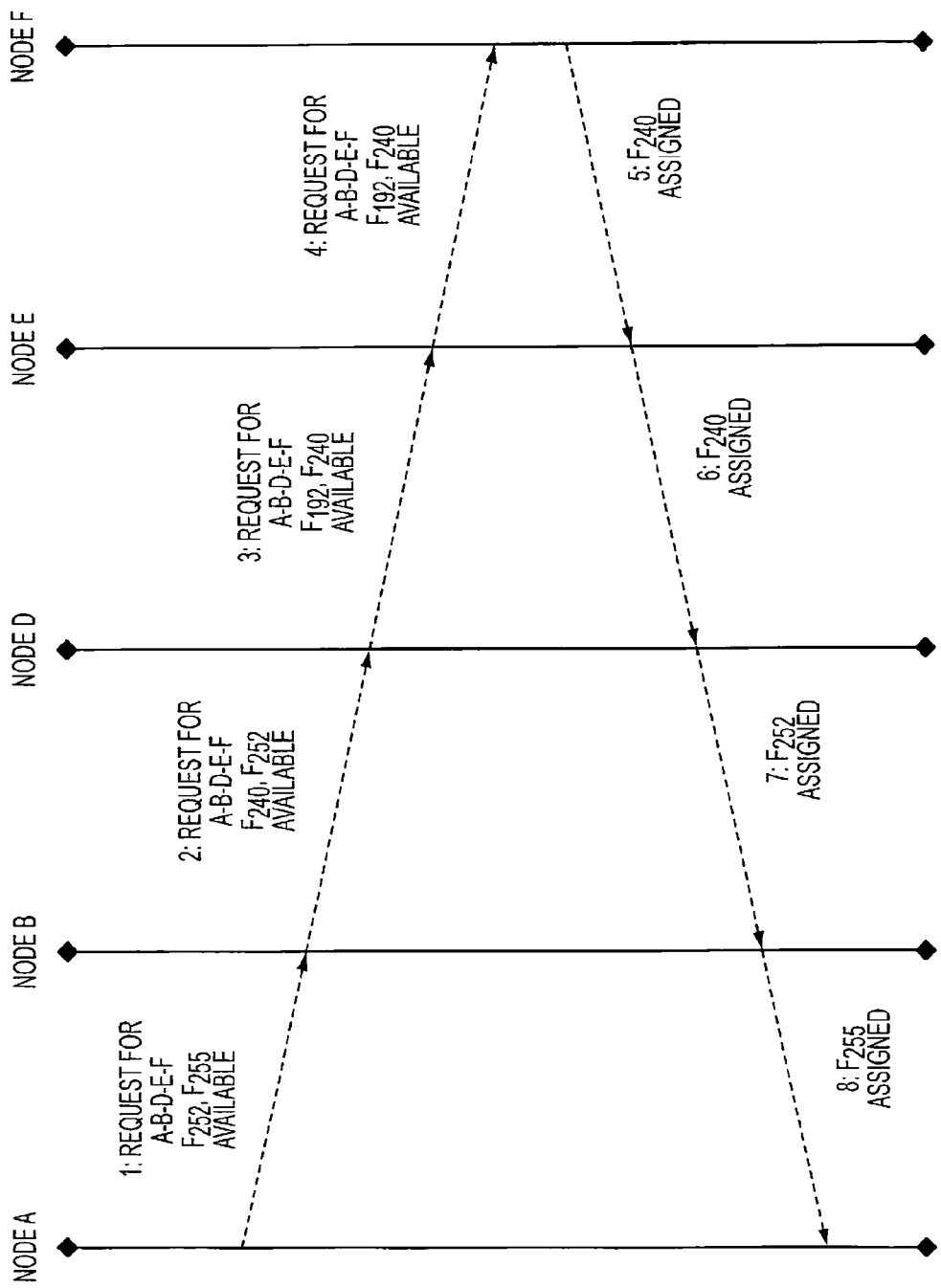
FIG. 16 illustrates the two-way reservation process that takes place prior to the establishment of a connection in the system of FIG. 15.

The correspondence between labels and wavebands is easily determined. For example, considering an arbitrary routing label $b_1b_0$, the corresponding waveband is $[b_1b_0000000,b_1b_0111111]$. In other words, all frequencies in the band $[b_1b_00000000,b_1b_01111111]$ are sent to the next-hop of the routing label $b_1b_0$, after being label-popped. Therefore, the mapping between next-hop nodes and routing labels can be specified by giving the mapping between next-hop nodes and wavebands. In the case of node OXC B, the equivalent description is the following:

Next-hop A: $[F_{64}, F_{127}]$
Next-hop C: $[F_{128}, F_{191}]$
Next-hop D: $[F_{192}, F_{255}]$ After receiving a connection request from the source 152, the first edge node 158 computes a path for the connection through the network 156. Assuming that this path is through OXC B, OXC D, OXC E, and OXC F, the first edge node 158 sends a path setup request along the selected path. This path setup request contains a list of wavelengths which may be assigned at each node 162 along the path, taking into account the following constraints: 1.) At each hop, the assigned channel must be available; 2.) For each node 162, the outgoing assigned wavelength channel is obtained from the incoming wavelength-channel through label-pop in the nodes 162 in the core network (i.e., it is not necessary to pop labels when the next-hop is either the first edge node 158 or the second edge node 160, although it is possible to do so); and 3.) The path defined by assigned wavelength-channels must match the path selected by the first edge node 158. FIG. 16 illustrates the two-way reservation process that takes place prior to the establishment of the connection between the source 152 and the destination 154 in the system 150 of FIG. 15.

The result of this path setup process depends on the current congestion in the network 156. For simplicity, it is assumed that the result of the path setup phase is the allocation of frequency $F_{255}$ between OXC A and OXC B, frequency $F_{252}$ between OXC B and OXC D, frequency $F_{240}$ between OXC D and OXC E, and frequency $F_{240}$ between OXC E and OXC F.

The label stack encoded in frequency $F_{255}$ can be checked to see if it matches the selected path. For example, the binary representation of $F_{255}$ is 11111111, which corresponds to four consecutive routing labels that are respectively $l_1=11$, $l_2=11$, $l_3=11$, and $l_4=11$. The first label $l_1=11$ is used at OXC B to select OXC D, as the label $l_1=11$ maps to OXC D for the next-hop. The application of the label-pop operation on $F_{255}$ yields $F_{252}$. Similar checks may be done for the other nodes 162 of the path.

Figure 17:
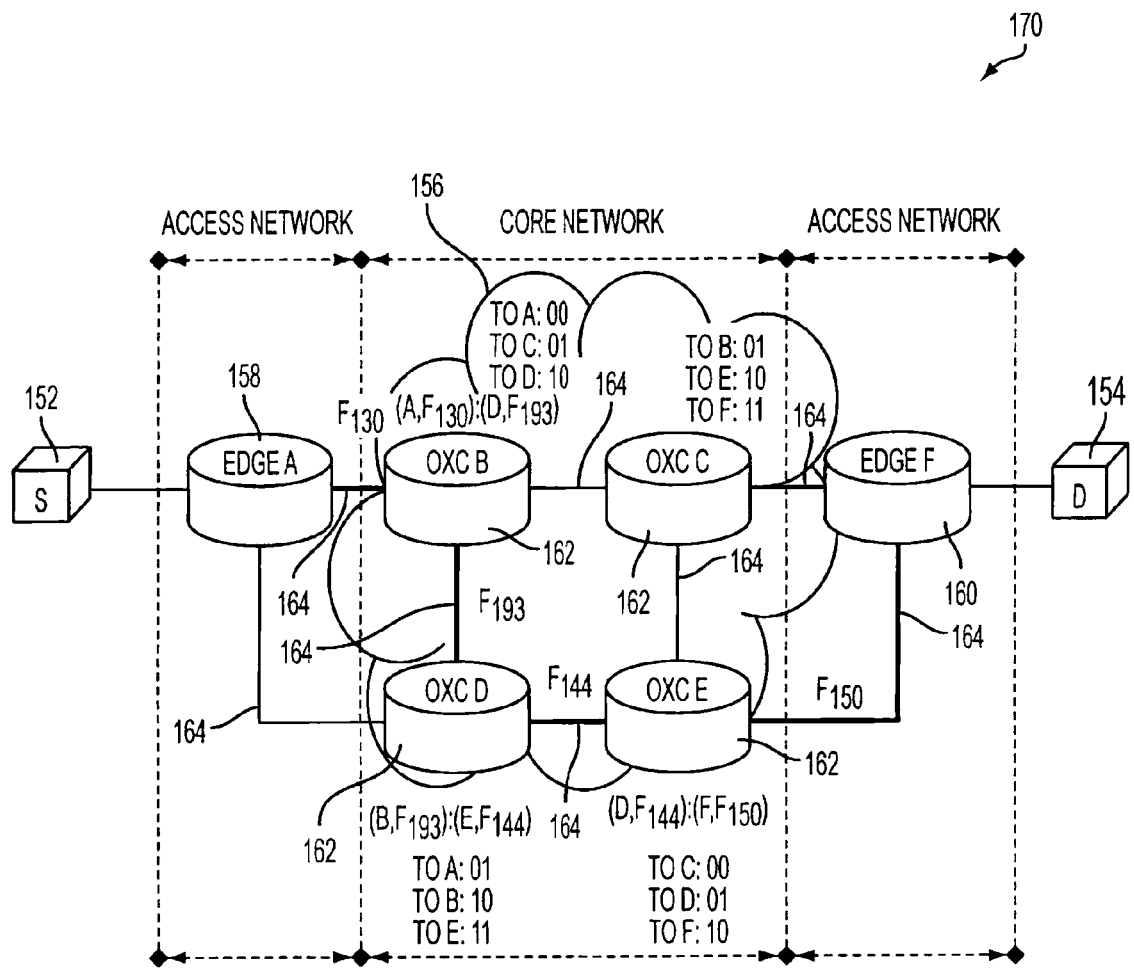
FIG. 17 shows a wavelength-switched WDM system that employs a label-swap operation in accordance with the present invention.

Referring to FIG. 17, there is shown a wavelength-switched WDM system 170 that employs the label-swap operation in accordance with the present invention. The system 170 of FIG. 17 is physically identical to the system 150 of FIG. 15 and thus is numerically identified as such. However, in the system 170 of FIG. 17, the wavelength-switched lightpath is formed by employing the label-swap operation, rather than the label-pop operation of the system 150 of FIG. 15.

In the system 170 of FIG. 17, the input wavelength does not carry the whole route information. Instead, the binding between incoming and outgoing routing labels is stored in connection tables of the nodes 162 of the path at connection setup. At each hop of the path, the wavelength of the lightpath is modified to carry the correct routing label for the next hop through the label-swap operation, and to avoid wavelength-collision with other ongoing circuits. Such a wavelength-interchange operation may be seen as a two-step process wherein the following two operations occur in sequence: 1.) Modification of the wavelength bits carrying the routing labels; and 2.) Modification of the wavelength contention resolution bits to avoid collision. The two operations operate on disjoint sets of wavelength bits.

Figure 18:
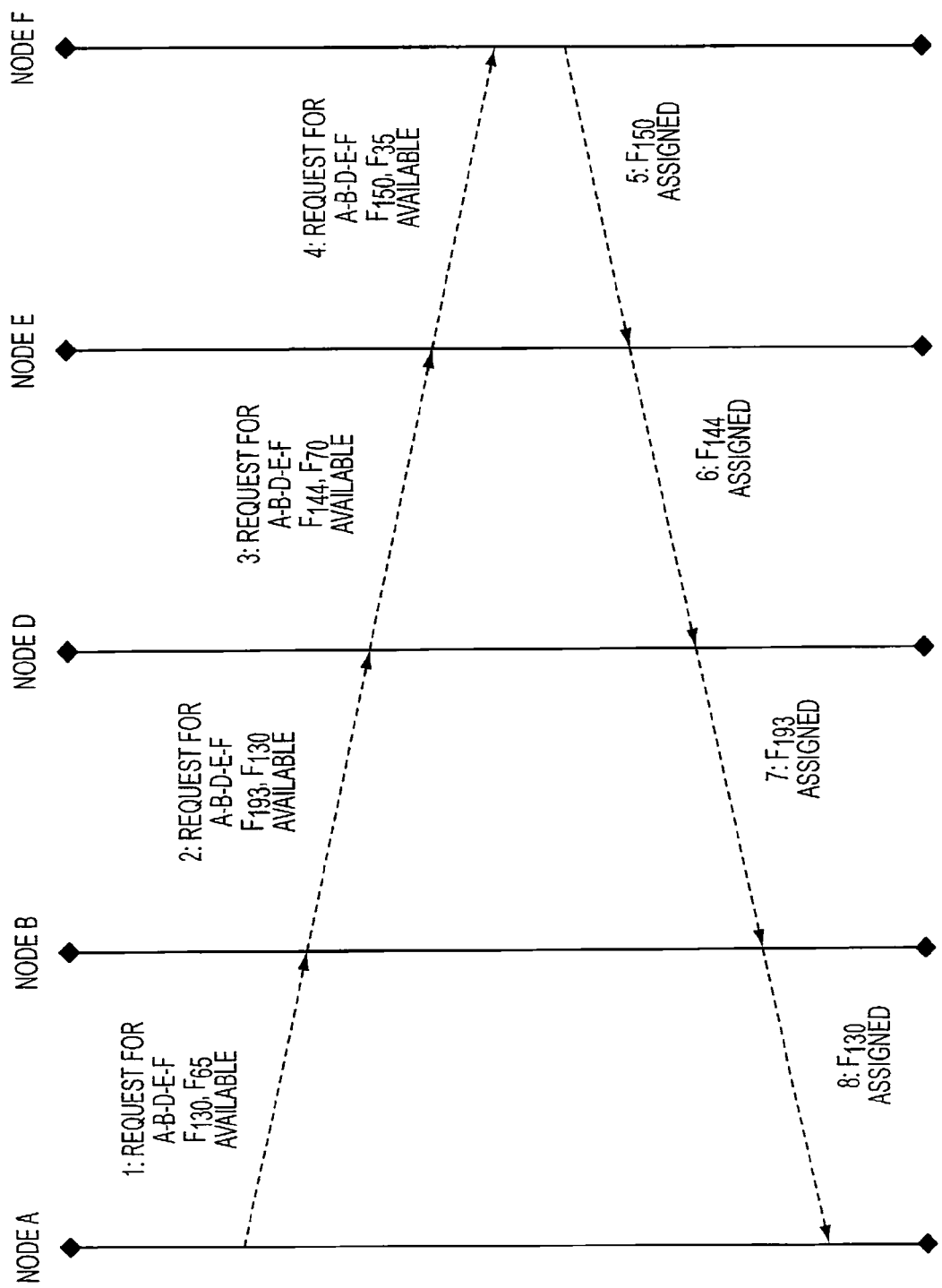
FIG. 18 illustrates the two-way reservation process that takes place prior to the establishment of a connection in the system of FIG. 17.

The mapping between next-hop nodes and labels is given for each node 162 in the core network by the small table located next to each node 162 in the core network, as shown in FIG. 17. Also shown next to each node 162 in the core network is the connection table entry corresponding to the selected lightpath between the source 152 and the destination 154 when the node 162 belongs to the lightpath. As with the system 150, it is easy to check that, at each hop of the lightpath, the routing label of the wavelength is swapped according to the target next hop node, and that no wavelength-collision occurs. FIG. 18 illustrates the two-way reservation process that takes place prior to the establishment of the connection between the source 152 and the destination 154 in the system 170 of FIG. 17.

In both of the above-described cases of wavelength-switched lightpaths (i.e., those utilizing the label-pop operation and the label-swap operation), the route computation algorithm generally must include the constraints corresponding to the mapping between wavebands and next-hop nodes which are imposed by the new label-switching paradigm in accordance with the present invention. In both cases, the route information is advertised at connection setup, and the wavelength channels must be explicitly allocated by network nodes.

In addition to the above-described cases of wavelength-switched lightpaths (i.e., those utilizing the label-pop operation and the label-swap operation), wavelength-switched lightpaths may also be realized utilizing a combination of the label-push operation and the label-pop operation. This additional wavelength-switching application, termed wavelength-trunking, is particularly beneficial in local and metropolitan area networks. That is, the costs of WDM systems increase with the granularity of wavelength channels. In local and metropolitan area networks, the costs of WDM nodes are still a determining factor of the commercial use of WDM. To address the cost issue, coarse WDM has been proposed where channel spacings are much larger than in long-haul dense WDM systems. This difference in wavelength-channel granularity between the two types of networks reflect deeper functional differences. Local and metropolitan area networks put a stress on per wavelength routing and switching functions, while long-haul networks have a more point-to-point nature and perform per wavelength operations only at the transmission layer to monitor the integrity of the optical signals. However, long-haul networks are evolving to perform a certain amount of wavelength-routing and switching. The large numbers of wavelength-channels, which may be soon supported by long-haul systems, prohibit the same level of functionality on a per wavelength-basis as in local or metropolitan networks. Therefore, waveband-switching schemes are appropriate to enable some wavelength-switching functionality in long-haul networks, with the definition of wavelength trunks corresponding to wavebands.

To implement such waveband-switching schemes, a combination of the label-push operation and the label-pop operation is used where a label is pushed/popped at network ingress/egress nodes according to the waveband or virtual path to which it is assigned. As in traditional data networks, virtual paths are defined by traffic engineering and traffic management activities. An important future revenue generating service of metropolitan area networks is the definition of virtual private optical networks, where different nodes are spread over different metropolitan networks connected by long-haul trunks. For the implementation of such services, wavelength-trunking based on label-push/pop operations is particularly appropriate because it is transparent to the nodes in the virtual private network and it preserves other wavelength-trunking information specific to the virtual private network.

Figure 19:
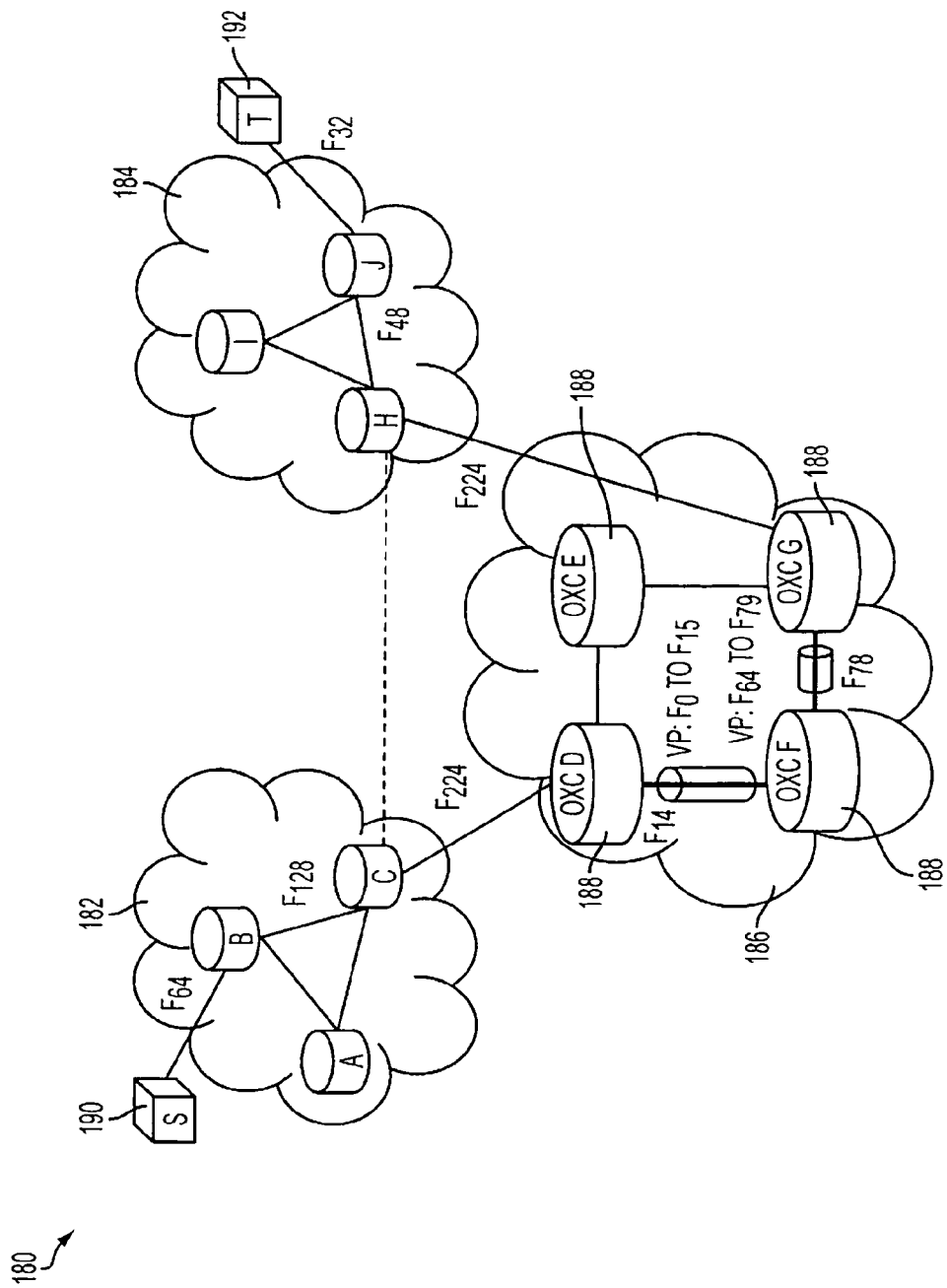
FIG. 19 shown a wavelength-switched WDM system that employs both the label-push operation and the label-pop operation to provide transparent wavelength-trunking between two metropolitan area networks.

Referring to FIG. 19, there is shown a wavelength-switched WDM system 180 that employs both the label-push operation and the label-pop operation to provide transparent wavelength-trunking between two metropolitan area networks. The system 180 comprises a first metropolitan area network 182 and a second metropolitan area network 184 that are both connected to a common long distance core network 186. The first metropolitan area network 182 includes nodes A, B, and C, while the second metropolitan area network 184 includes nodes H, I, and J. The core network 186 includes a plurality of optical cross-connects (OXCs) 188. Both the first metropolitan area network 182 and the second metropolitan area network 184 have a wavelength granularity that is sixteen times coarser than that supported by the core network 186.

It should be assumed that all the networks 182, 184, and 186 share the same frequency set $F_0, F_1, \ldots F_{255}$. However, the frequencies used in the first metropolitan area network 182 and the second metropolitan area network 184 are of the form $F_{16 \cdot i}$, where i is an integer between 0 and 15. Also, the different networks may use any form of wavelength-switching, including any of those described above (i.e., those utilizing the label-pop operation and the label-swap operation).

In the core network 186, a virtual path (i.e., VP in FIG. 19) is established from OXC D to OXC G though OXC F. The virtual path carries the frequencies in the range $[F_0, F_{15}]$ between OXC D and OXC F, and in the range $[F_{64}, F_{79}]$ between OXC F and OXC G. If a label length of 4 is considered in the core network 186, the consecutive values of the topmost label of the virtual path are 0000 in the link between OXC D and OXC F, and 0100 in the link between OXC F and OXC G. For some connection between a source node (S) 190 and a termination node (T) 192, a path from node B to node C to OXC D to OXC F to OXC G to node H to node J is selected. The routing and wavelength assignment algorithm allocates specific frequencies in the links of the path included in the first metropolitan area network 182 and the second metropolitan area network 184. Such assignment is based on the distribution of the load in the first metropolitan area network 182 and the second metropolitan area network 184. To transport the connection over the core network 186, the virtual path is used by selecting a frequency that meets the following conditions: 1.) It belongs to the set used by the metropolitan area networks 182 and 184 (i.e., it is of the form $F_{16 \cdot i}$); 2.) It is free over the node C to OXC D link and the OXC G to node H link; and 3.) When the first label of the virtual path is pushed into the wavelength, a wavelength is obtained that is available in the range allocated to the virtual path. It is assumed that such a frequency is $F_{224}$, which becomes $F_{14}$ when label 0000 is pushed into the wavelength. In the virtual path, the allocated channel is $F_{14}$ between OXC D and OXC F, and $F_{78}$ between OXC F and OXC G. At OXC G, the allocated channel is label-popped (i.e., the popped label is 0100) to obtain $F_{224}$. Overall, the operations in the core network 186 are completely transparent to the first metropolitan area network 182 and to the second metropolitan area network 184.

Figure 20:
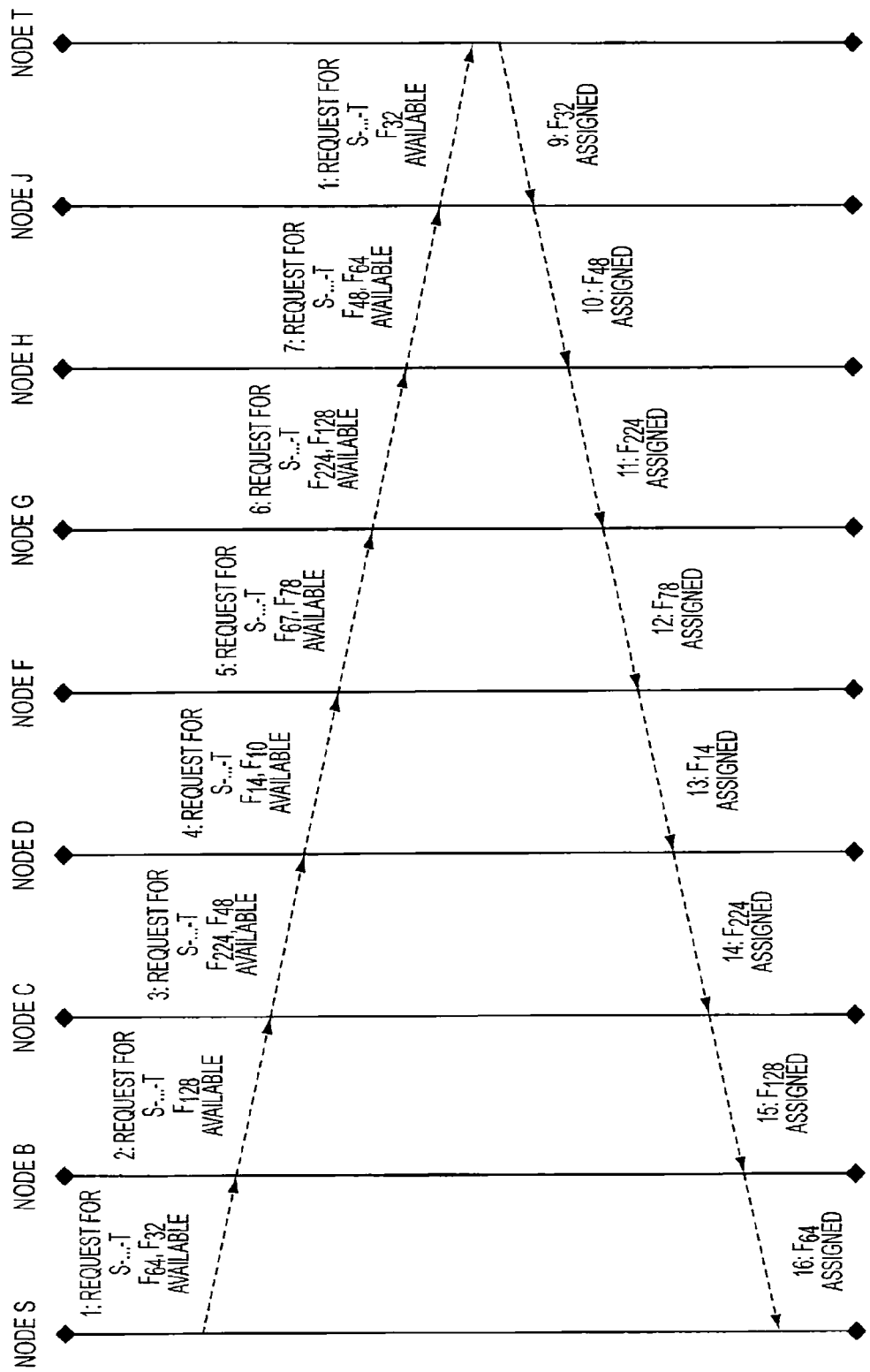
FIG. 20 illustrates the two-way reservation process that takes place prior to the establishment of a connection in the system of FIG. 19.

FIG. 20 illustrates the two-way reservation process that takes place prior to the establishment of the connection between the source node (S) 190 and the termination node (T) 192 in the system 180 of FIG. 19.

Figure 21:
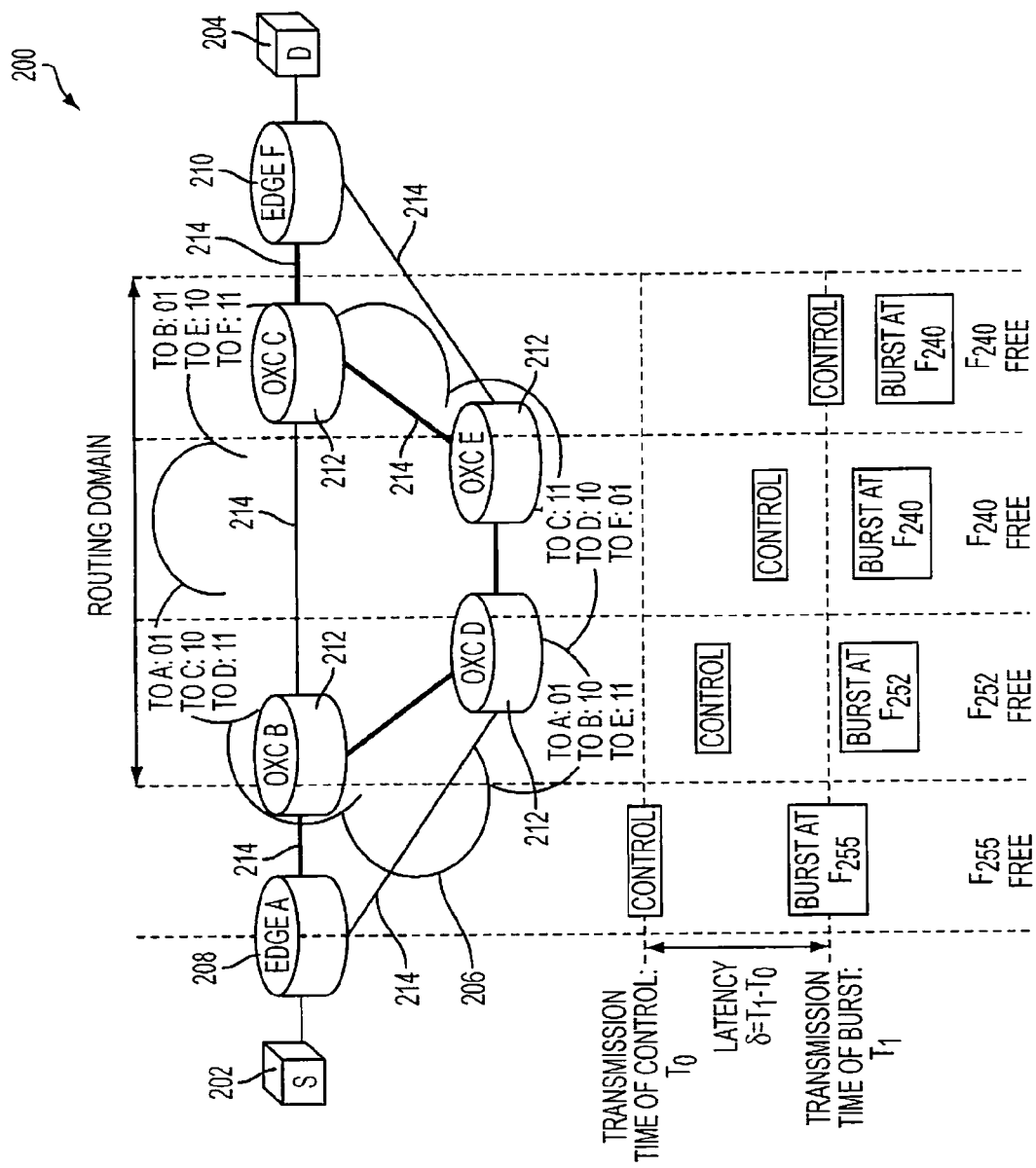
FIG. 21 shows an optical burst-switched WDM system that employs a label-pop operation to successfully switch an optical burst in accordance with the present invention.

Referring to FIG. 21, there is shown an optical burst-switched WDM system 200 that employs the label-pop operation in accordance with the present invention. The optical burst-switched WDM system 200 comprises a source 202, a destination 204, and a network 206, which includes a first edge node 208, a second edge node 210, and a plurality of optical cross-connects (OXC) 212 interconnected by a plurality of interconnects 214. Similar to the wavelength-switched WDM system 150 of FIG. 15, in the optical burst-switched WDM system 200 of FIG. 21 a number W=256 (i.e., N=8) of consecutive regularly spaced wavelength channels are assumed, as is a label length L=2. Also, it is assumed that the traffic demand comprises one wavelength channel between the source 202 and the destination 204. However, in the system 200 of FIG. 21, there is no need to establish physical cross-connections on a per-burst basis. That is, the system 200 of FIG. 21 may support optical burst-switching (OBS) provided that the network nodes 212 have the two following capabilities: 1.) Interpretation of OBS control messages to resolve contention among optical bursts; and 2.) Assignment of absolute priority of wavelength-switched traffic over burst-switched traffic. If such is the case, the first edge node 208 may encode multi-hop route information into a burst by assigning it to the correct ingress wavelength. In networks of moderate size, all the route information may be encoded into the wavelength and decoded at network nodes 212 by the label-pop operation, as shown in FIG. 21. In the example shown in FIG. 21, at each network hop (except the last one leading to the second edge node 210), the wavelength of the optical burst is popped according to the label-pop operation described above. Thus, the label-pop operation and the waveband routing process provide high-performance burst forwarding by eliminating the need to establish physical cross-connections on a per-burst basis. Further, on an H hop path, the minimum burst transmission latency reduces from $H.(\delta_x+\delta_m)-\delta_p$ (which is the case for conventional optical burst switching systems, as described above) to $\delta_{min}=H.\delta_m-\delta_p$.

At this point it should be noted that a proper contention resolution mechanism is critical to successful transmissions. To assign absolute priority to wavelength-switched lightpaths, a simple scheme is considered where optical bursts are dropped if they are carried on wavelengths already assigned to ongoing circuits, and where burst collisions are allowed in the core network. In such a case, a burst is successfully transmitted when it does not use any busy wavelength on its path, and does not collide with other bursts. As described above, FIG. 21 illustrates a successfully transmitted burst. In contrast, FIG. 22 illustrates an unsuccessful burst transmission in the system 200 of FIG. 21 due to a wavelength already having been assigned to an ongoing circuit.

Figure 22:
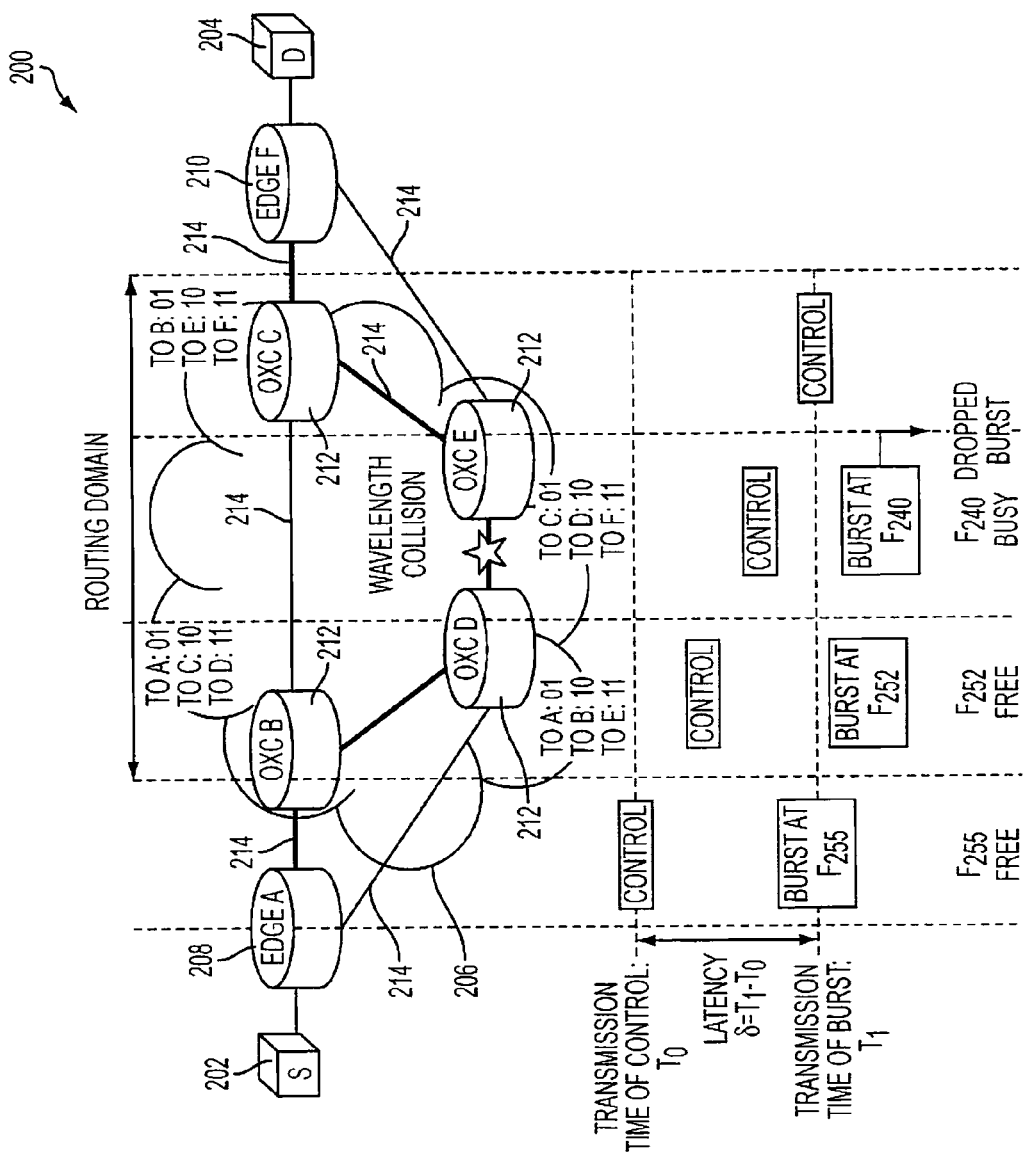
FIG. 22 shows the optical burst-switched WDM system of FIG. 21 wherein an optical burst is unsuccessfully switched due to a wavelength already having been assigned to an ongoing circuit.

As with the system 150 of FIG. 15 and the system 170 of FIG. 17, it is easy to check that the wavelength carrying the optical burst in the system 200 of FIGS. 21 and 22 is changed according to the label-pop operation, and that the ingress wavelength carries the whole route information. More sophisticated contention resolution schemes may be considered within the scope of the present invention where contending optical bursts are buffered or deflected.

As described above, the label-pop operation enables the efficient implementation of source routing for optical burst-switching (OBS). However, labels may also correspond to virtual paths that are themselves label-switched. When the topmost label of an optical burst maps to such a virtual path, the label stack of the virtual path may be pushed (i.e., via the label-push operation) into the stack of the burst to enable proper forwarding. Thus, optical burst-switching (OBS) may also be efficiently implemented utilizing the label-push operation in accordance with the present invention.

In view of the foregoing, the new label-switching paradigm described herein supports wavelength-switching, wavelength-trunking, as well as optical burst-switching, by encoding part or all of a network route into the wavelength assigned to bursts or circuits at a network ingress node. The new label-switching approach is a new development in the area of waveband routing where, at network nodes, disjoint wavebands are assigned to outgoing interfaces, and incoming channels are routed to outgoing interfaces according to their incoming interfaces and to the band to which they belong. Typically, the wavebands form a partition of the available spectrum. When optical frequencies are mapped to corresponding binary numbers, the waveband of a particular optical frequency is identified by a specific bit pattern, which corresponds to a routing label.

Waveband routing is quite appropriate for optical burst-switching (OBS) because it does not require physical cross-connection on a per-burst basis in optical cross-connects (OXCs). However, when using waveband routing, a major problem is the composition of the end-to-end routing service, when the bands are defined locally. In the worst-case, the different wavebands needed along specific paths may not intersect, therefore preventing the use of waveband routing for the selected paths.

An important difference between the present invention and previous waveband routing schemes lies in a solution to the waveband-intersection problem. The solution is based on a systematic transformation of routing labels at each network node to enable proper forwarding at the next-hop. These transformations use specific operations, which we call label-swap, label-pop, and label-push to be consistent with the MPLS model (see D. Awduche, "MPLS traffic engineering in IP networks", IEEE Communications magazine, vol. 37, pages 42–47, December 1999).

The label-swap operation involves replacing a current routing label by another routing label that was previously advertised by the signaling protocol at connection setup.

The label-pop operation occurs when the binary number corresponding to a given optical frequency is partitioned into several consecutive bit-fields, which correspond to routing labels, and form a label stack. The label-pop operation involves popping the label stack by removing the topmost label, and by shifting the position of all of the other labels of the stack by a number of bits equal to the size of the removed label. The advantage of the label-pop operation is to enable source routing by encoding multiple routing labels when proper wavelengths are selected at a network ingress node.

The label-push operation inserts new routing labels into the stack. In combination, label-pop and label-push operations also provide good means to support wavelength-trunking, when network ingress nodes with classifying functions push labels into wavelengths according to virtual lightpaths through which they must be routed.

All the above-mentioned label-stack operations only require wavelength-conversion devices. For these reasons, they may be implemented by all-optical means, which provide high data packet forwarding performance. The new label-switching paradigm decouples the optical data forwarding process from the wavelength-contention problem. Therefore, network nodes are able to route optical packets or bursts on demand, independent of quality-of-service (QoS) levels that result from the contention resolution process. Despite this added flexibility, the new label-switching paradigm can still support traditional wavelength-switching. Overall, the new label-switching paradigm enables the design of networks possessing mixed wavelength-switching and optical burst-switching (OBS) capabilities supported on the same network infrastructure.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for routing data within an optical network having a plurality of network nodes, the method comprising the steps of:

receiving data at a first network node via a first optical signal having a first wavelength, the first wavelength corresponding to a first optical frequency, the first optical frequency being mapped to a first binary representation, the first binary representation being divided into a first plurality of fields, at least one of the first plurality of fields corresponding to a routing label in a first label stack, a top routing label in the first label stack indicating a second network node; and based at least partially upon the top routing label, transmitting the data from the first network node to the second network node via a second optical signal having a second wavelength.

2. The method as defined in claim 1, further comprising the step of:

popping the top routing label off the first label stack so as to promote a next routing label in the first label stack.

3. The method as defined in claim 2, wherein the second wavelength corresponds to a second optical frequency, the second optical frequency being mapped to a second binary representation, the second binary representation being divided into a second plurality of fields, at least one of the second plurality of fields corresponding to a routing label in a second label stack, a top routing label in the second label stack indicating a third network node.

4. The method as defined in claim 3, wherein the top routing label in the second label stack corresponds to the next routing label in the first label stack.

5. The method as defined in claim 4, wherein the network accommodates $2^N$ frequencies in the form of, $$f_i = f_0 + i \cdot \Delta f$$

wherein i=0, 1, . . . $2^N-1$, wherein the second optical frequency is defined by, $$f_{i_{out}} = f_0 + 2^L((f_{i_{in}} - f_0) - 2^{N-L} \cdot l \cdot \Delta f)$$

and, $$i_{out} = 2^L(i_{in} - 2^{N-L} \cdot l)$$

wherein $fi_{in}$ represents the first optical frequency, l represents the value of the top routing label in the first label stack, and L represents the bit length of the top routing label in the first label stack.

6. The method as defined in claim 1, further comprising the step of:

swapping the top routing label in the first label stack with a new routing label when the first label stack contains more than two routing labels.

7. The method as defined in claim 6, wherein the second wavelength corresponds to a second optical frequency, the second optical frequency being mapped to a second binary representation, the second binary representation being divided into a second plurality of fields, at least one of the second plurality of fields corresponding to a routing label in a second label stack, a top routing label in the second label stack indicating a third network node.

8. The method as defined in claim 7, wherein the top routing label in the second label stack corresponds to the new routing label.

9. The method as defined in claim 8, wherein the network accommodates $2^N$ frequencies in the form of, $$f_i = f_0 + i \cdot \Delta f$$

wherein i=0, 1, . . . $2^N-1$, wherein the second optical frequency is defined by, $$f_{i_{out}} = f_{i_{in}} + 2^{N-L}(l-l^1)\Delta f$$

and, $$i_{out} = i_{in} + 2^{N-L}(l-l^1)$$

wherein $fi_{in}$ represents the first optical frequency, $l^1$ represents the value of the top routing label in the first label stack, l represents the value of the new routing label, and L represents the bit length of the top routing label in the first label stack.

10. The method as defined in claim 1, further comprising the step of:

pushing a new routing label onto the first label stack.

11. The method as defined in claim 10, wherein the second wavelength corresponds to a second optical frequency, the second optical frequency being mapped to a second binary representation, the second binary representation being divided into a second plurality of fields, at least one of the second plurality of fields corresponding to a routing label in a second label stack, a top routing label in the second label stack indicating a third network node.

12. The method as defined in claim 11, wherein the top routing label in the second label stack corresponds to the new routing label.

13. The method as defined in claim 12, wherein the network accommodates $2^N$ frequencies in the form of, $$f_i = f_0 + i \cdot \Delta f$$

wherein i=0, 1, . . . $2^N-1$, wherein the second optical frequency is defined by, $$f_{i_{out}} = f_0 + \left\lfloor \frac{(f_{i_{in}} - f_0)}{\Delta f} \right\rfloor \cdot 2^{-L} \cdot \Delta f + 2^{N-L} \cdot l \cdot \Delta f$$

and, $$i_{out} = \left\lfloor \frac{i_{in}}{2^L} \right\rfloor + 2^{N-L} \cdot l$$

wherein $fi_{in}$ represents the first optical frequency, l represents the value of the top routing label in the second label stack, and L represents the bit length of the top routing label in the second label stack.

14. The method as defined in claim 1, wherein the first wavelength is the different from the second wavelength.

15. The method as defined in claim 1, wherein the first wavelength is the same as the second wavelength.

16. The method as defined in claim 1, wherein at least another one of the first plurality of fields corresponds to a termination field indicating an end of the first label stack.

17. The method as defined in claim 1, wherein at least another one of the first plurality of fields corresponds to a contention field for differentiating the first wavelength from a third wavelength.

18. The method as defined in claim 17, wherein the data is a first data, wherein second data is received at the first network node via a third optical signal having the third wavelength, and wherein the first optical signal and the third optical signal have similar routing paths through the network.

19. An apparatus for routing data within an optical network having a plurality of network nodes, the apparatus comprising:

an optical receiver for receiving data at a first network node via a first optical signal having a first wavelength, the first wavelength corresponding to a first optical frequency, the first optical frequency being mapped to a first binary representation, the first binary representation being divided into a first plurality of fields, at least one of the first plurality of fields corresponding to a routing label in a first label stack, a top routing label in the first label stack indicating a second network node; and an optical transmitter for transmitting, based at least partially upon the top routing label, the data from the first network node to the second network node via a second optical signal having a second wavelength.

20. The apparatus as defined in claim 19, wherein the first wavelength is the different from the second wavelength.

21. The apparatus as defined in claim 19, wherein the first wavelength is the same as the second wavelength.

22. The apparatus as defined in claim 19, wherein at least another one of the first plurality of fields corresponds to a termination field indicating an end of the first label stack.

23. The apparatus as defined in claim 19, wherein at least another one of the first plurality of fields corresponds to a contention field for differentiating the first wavelength from a third wavelength.

24. The apparatus as defined in claim 23, wherein the data is a first data, wherein second data is received at the first network node via a third optical signal having the third wavelength, and wherein the first optical signal and the third optical signal have similar routing paths through the network.

* * * * *